(12) United States Patent
Srinivasan et al.

(10) Patent No.: US 11,386,908 B2
(45) Date of Patent: Jul. 12, 2022

(54) METHODS AND APPARATUS TO PERFORM AUDIO WATERMARKING AND WATERMARK DETECTION AND EXTRACTION

(71) Applicant: The Nielsen Company (US), LLC, New York, NY (US)

(72) Inventors: Venugopal Srinivasan, Palm Harbor, FL (US); Alexander Pavlovich Topchy, New Port Richey, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 16/182,321

(22) Filed: Nov. 6, 2018

(65) Prior Publication Data

US 2019/0074021 A1    Mar. 7, 2019

Related U.S. Application Data

(63) Continuation of application No. 15/331,168, filed on Oct. 21, 2016, now Pat. No. 10,134,408, which is a
(Continued)

(51) Int. Cl.
*G10L 19/00* (2013.01)
*G10L 19/018* (2013.01)
(Continued)

(52) U.S. Cl.
CPC ........ *G10L 19/018* (2013.01); *G10L 19/0208* (2013.01); *G10L 19/173* (2013.01);
(Continued)

(58) Field of Classification Search
CPC .............. G10L 19/018; H04N 21/8358; H04N 2005/91335; H04N 5/913; G06F 21/10; G06F 2221/0737; G06F 2221/0733
See application file for complete search history.

(56) References Cited

U.S. PATENT DOCUMENTS

| 4,230,990 A | 10/1980 | Lert, Jr. et al. |
| 4,647,974 A | 3/1987 | Butler et al. |

(Continued)

FOREIGN PATENT DOCUMENTS

| AU | 8976601 | 2/2002 |
| AU | 9298201 | 4/2002 |

(Continued)

OTHER PUBLICATIONS

United States Patent and Trademark Office, "Non-Final Office Action" issued in connection with U.S. Appl. No. 15/331,168, dated Oct. 6, 2017, 9 pages.

(Continued)

*Primary Examiner* — Mark Villena
(74) *Attorney, Agent, or Firm* — Hanley, Flight & Zimmerman, LLC

(57) ABSTRACT

Example methods and apparatus to audio watermarking and watermark detection and extraction are disclosed herein. Example methods disclosed herein include determining a first watermark symbol encoded in encoded audio samples and storing the first watermark symbol in tangible memory. Disclosed example methods also include determining a second watermark symbol encoded in the encoded audio samples and storing the second watermark symbol in the tangible memory. Disclosed example methods further include, in response to determining that the first watermark symbol matches the second watermark symbol, outputting the first watermark symbol.

19 Claims, 19 Drawing Sheets

Related U.S. Application Data continuation of application No. 12/464,811, filed on May 12, 2009, now Pat. No. 9,667,365.

(60) Provisional application No. 61/174,708, filed on May 1, 2009, provisional application No. 61/108,380, filed on Oct. 24, 2008.

(51) Int. Cl.

| | | |
|---|---|---|
| *G11B 20/10* | (2006.01) | |
| *H04H 60/37* | (2008.01) | |
| *H04H 60/58* | (2008.01) | |
| *H04H 20/31* | (2008.01) | |
| *G10L 19/02* | (2013.01) | |
| *G10L 19/16* | (2013.01) | |

(52) U.S. Cl.
CPC ............. *G11B 20/10* (2013.01); *H04H 20/31* (2013.01); *H04H 60/37* (2013.01); *H04H 60/58* (2013.01)

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |
| 4,745,468 A | 5/1988 | Von Kohorn |
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |
| 5,117,228 A | 5/1992 | Fuchigami et al. |
| 5,128,752 A | 7/1992 | Von Kohorn |
| 5,157,489 A | 10/1992 | Lowe |
| 5,227,874 A | 7/1993 | Von Kohorn |
| 5,234,345 A | 8/1993 | Weinblatt |
| 5,245,665 A | 9/1993 | Lewis et al. |
| 5,249,044 A | 9/1993 | Von Kohorn |
| 5,283,734 A | 2/1994 | Von Kohorn |
| 5,287,266 A | 2/1994 | Malec et al. |
| 5,331,544 A | 7/1994 | Lu et al. |
| 5,373,315 A | 12/1994 | Dufresne et al. |
| 5,401,946 A | 3/1995 | Weinblatt |
| 5,425,100 A | 6/1995 | Thomas et al. |
| 5,444,769 A | 8/1995 | Koen et al. |
| 5,450,490 A | 9/1995 | Jensen et al. |
| 5,453,790 A | 9/1995 | Vermeulen et al. |
| 5,481,294 A | 1/1996 | Thomas et al. |
| 5,483,276 A | 1/1996 | Brooks et al. |
| 5,485,199 A | 1/1996 | Elkind et al. |
| 5,512,933 A | 4/1996 | Wheatley et al. |
| 5,524,195 A | 6/1996 | Clanton, III et al. |
| 5,526,427 A | 6/1996 | Thomas et al. |
| 5,543,856 A | 8/1996 | Rosser et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,675,510 A | 10/1997 | Coffey et al. |
| 5,682,196 A | 10/1997 | Freeman |
| 5,719,634 A | 2/1998 | Keery et al. |
| 5,719,880 A | 2/1998 | Leung |
| 5,734,413 A | 3/1998 | Lappington et al. |
| 5,740,035 A | 4/1998 | Cohen et al. |
| 5,764,763 A | 6/1998 | Jensen et al. |
| 5,768,680 A | 6/1998 | Thomas |
| 5,787,334 A | 7/1998 | Fardeau et al. |
| 5,801,747 A | 9/1998 | Bedard |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,878,384 A | 3/1999 | Johnson et al. |
| 5,880,789 A | 3/1999 | Inaba |
| 5,889,548 A | 3/1999 | Chan |
| 5,893,067 A | 4/1999 | Bender et al. |
| 5,907,366 A | 5/1999 | Farmer et al. |
| 5,918,223 A | 6/1999 | Blum et al. |
| 5,930,369 A | 7/1999 | Cox et al. |
| 5,933,789 A | 8/1999 | Byun et al. |
| 5,956,674 A | 9/1999 | Smyth et al. |
| 5,956,716 A | 9/1999 | Kenner et al. |
| 5,956,743 A | 9/1999 | Bruce et al. |
| 5,966,120 A | 10/1999 | Arazi et al. |
| 5,974,380 A | 10/1999 | Smyth et al. |
| 5,974,396 A | 10/1999 | Anderson et al. |
| 5,978,855 A | 11/1999 | Metz et al. |
| 5,987,855 A | 11/1999 | Dey et al. |
| 6,005,490 A | 12/1999 | Higashihara |
| 6,029,045 A | 2/2000 | Picco et al. |
| 6,034,722 A | 3/2000 | Viney et al. |
| 6,035,177 A | 3/2000 | Moses et al. |
| 6,049,830 A | 4/2000 | Saib |
| 6,055,573 A | 4/2000 | Gardenswartz et al. |
| 6,097,441 A | 8/2000 | Allport |
| 6,108,637 A | 8/2000 | Blumenau |
| 6,115,680 A | 9/2000 | Coffee et al. |
| 6,119,092 A | 9/2000 | Patwardhan et al. |
| 6,125,368 A | 9/2000 | Bridge et al. |
| 6,128,597 A | 10/2000 | Kolluru et al. |
| 6,154,209 A | 11/2000 | Naughton et al. |
| 6,157,413 A | 12/2000 | Hanafee et al. |
| 6,208,735 B1 | 3/2001 | Cox et al. |
| 6,216,129 B1 | 4/2001 | Eldering |
| 6,221,881 B1 | 4/2001 | Garvey et al. |
| 6,263,505 B1 | 7/2001 | Walker et al. |
| 6,266,815 B1 | 7/2001 | Shen et al. |
| 6,286,036 B1 | 9/2001 | Rhoads |
| 6,286,140 B1 | 9/2001 | Ivanyi |
| 6,298,348 B1 | 10/2001 | Eldering |
| 6,300,888 B1 | 10/2001 | Chen et al. |
| 6,308,327 B1 | 10/2001 | Liu et al. |
| 6,331,876 B1 | 12/2001 | Koster et al. |
| 6,335,736 B1 | 1/2002 | Wagner et al. |
| 6,353,929 B1 | 3/2002 | Houston |
| 6,363,159 B1 | 3/2002 | Rhoads |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,457,010 B1 | 9/2002 | Eldering et al. |
| 6,466,913 B1 | 10/2002 | Yasuda et al. |
| 6,467,089 B1 | 10/2002 | Aust et al. |
| 6,487,564 B1 | 11/2002 | Asai et al. |
| 6,505,160 B1 | 1/2003 | Levy et al. |
| 6,507,299 B1 | 1/2003 | Nuijten |
| 6,512,836 B1 | 1/2003 | Xie et al. |
| 6,513,014 B1 | 1/2003 | Walker et al. |
| 6,516,079 B1 * | 2/2003 | Rhoads .................. G06T 1/005 348/E7.061 |
| 6,522,771 B2 | 2/2003 | Rhoads |
| 6,539,095 B1 | 3/2003 | Rhoads |
| 6,546,556 B1 | 4/2003 | Kataoka et al. |
| 6,553,127 B1 | 4/2003 | Kurowski |
| 6,553,178 B2 | 4/2003 | Abecassis |
| 6,606,605 B1 | 8/2003 | Kolls |
| 6,607,136 B1 | 8/2003 | Atsmon et al. |
| 6,614,914 B1 | 9/2003 | Rhoads et al. |
| 6,621,881 B2 | 9/2003 | Srinivasan |
| 6,642,966 B1 | 11/2003 | Limaye |
| 6,647,269 B2 | 11/2003 | Hendrey et al. |
| 6,647,548 B1 | 11/2003 | Lu et al. |
| 6,651,253 B2 | 11/2003 | Dudkiewicz et al. |
| 6,654,480 B2 | 11/2003 | Rhoads |
| 6,665,873 B1 | 12/2003 | Van Gestel et al. |

(56) References Cited

U.S. PATENT DOCUMENTS

| | | |
|---|---|---|
| 6,675,383 B1 | 1/2004 | Wheeler et al. |
| 6,681,209 B1 | 1/2004 | Schmidt et al. |
| 6,683,966 B1 | 1/2004 | Tian et al. |
| 6,687,663 B1 | 2/2004 | McGrath et al. |
| 6,710,815 B1 | 3/2004 | Billmaier et al. |
| 6,714,683 B1 | 3/2004 | Tian et al. |
| 6,735,775 B1 | 5/2004 | Massetti |
| 6,741,684 B2 | 5/2004 | Kaars |
| 6,745,011 B1 | 6/2004 | Hendrickson et al. |
| 6,748,362 B1 | 6/2004 | Meyer et al. |
| 6,750,985 B2 | 6/2004 | Rhoads |
| 6,754,470 B2 | 6/2004 | Hendrickson et al. |
| 6,766,523 B2 | 7/2004 | Herley |
| 6,795,972 B2 | 9/2004 | Rovira |
| 6,804,379 B2 | 10/2004 | Rhoads |
| 6,804,566 B1 | 10/2004 | Colomes et al. |
| 6,823,310 B2 | 11/2004 | Ishito et al. |
| 6,829,368 B2 | 12/2004 | Meyer et al. |
| 6,845,360 B2 | 1/2005 | Jensen et al. |
| 6,853,634 B1 | 2/2005 | Davies et al. |
| 6,871,180 B1 | 3/2005 | Neuhauser et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,958,710 B2 | 10/2005 | Zhang et al. |
| 6,965,601 B1 | 11/2005 | Nakano et al. |
| 6,968,315 B1 | 11/2005 | Srinivasan |
| 6,968,371 B1 | 11/2005 | Srinivasan |
| 6,968,564 B1 | 11/2005 | Srinivasan |
| 6,970,131 B2 | 11/2005 | Percy et al. |
| 6,970,886 B1 | 11/2005 | Conwell et al. |
| 6,996,213 B1 | 2/2006 | De Jong |
| 7,003,731 B1 | 2/2006 | Rhoads et al. |
| 7,006,555 B1 | 2/2006 | Srinivasan |
| 7,038,619 B2 | 5/2006 | Percy et al. |
| 7,039,932 B2 | 5/2006 | Eldering |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,092,964 B1 | 8/2006 | Dougherty et al. |
| 7,095,871 B2 | 8/2006 | Jones et al. |
| 7,127,261 B2 | 10/2006 | Van Erlach |
| 7,131,007 B1 | 10/2006 | Johnston et al. |
| 7,143,949 B1 | 12/2006 | Hannigan |
| 7,155,159 B1 | 12/2006 | Weinblatt et al. |
| 7,155,210 B2 | 12/2006 | Benson |
| 7,158,943 B2 | 1/2007 | Van der Riet |
| 7,171,018 B2 | 1/2007 | Rhoads et al. |
| 7,174,293 B2 | 2/2007 | Kenyon et al. |
| 7,185,201 B2 | 2/2007 | Rhoads et al. |
| 7,194,752 B1 | 3/2007 | Kenyon et al. |
| 7,197,156 B1 | 3/2007 | Levy |
| 7,203,338 B2 | 4/2007 | Ramaswamy et al. |
| 7,215,280 B1 | 5/2007 | Percy et al. |
| 7,221,405 B2 | 5/2007 | Basson et al. |
| 7,227,972 B2 | 6/2007 | Brundage et al. |
| 7,239,981 B2 | 7/2007 | Kolessar et al. |
| 7,248,715 B2 | 7/2007 | Levy |
| 7,254,249 B2 | 8/2007 | Rhoads et al. |
| 7,260,221 B1 | 8/2007 | Atsmon |
| 7,269,564 B1 | 9/2007 | Milsted et al. |
| 7,269,734 B1 | 9/2007 | Johnston et al. |
| 7,273,978 B2 | 9/2007 | Uhle |
| 7,280,970 B2 | 10/2007 | Tamir et al. |
| 7,317,716 B1 | 1/2008 | Boni et al. |
| 7,328,153 B2 | 2/2008 | Wells et al. |
| 7,328,160 B2 | 2/2008 | Nishio et al. |
| 7,334,735 B1 | 2/2008 | Antebi et al. |
| 7,346,512 B2 | 3/2008 | Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,383,297 B1 | 6/2008 | Atsmon et al. |
| 7,421,723 B2 | 9/2008 | Harkness et al. |
| 7,440,674 B2 | 10/2008 | Plotnick et al. |
| 7,443,292 B2 | 10/2008 | Jensen et al. |
| 7,463,143 B2 | 12/2008 | Forr et al. |
| 7,519,658 B1 | 4/2009 | Anglin et al. |
| 7,540,012 B1 | 5/2009 | Herzberg et al. |
| 7,577,195 B2 | 8/2009 | Hickey, Jr. |
| 7,586,439 B2 | 9/2009 | Percy et al. |
| 7,587,732 B2 | 9/2009 | Wright et al. |
| 7,592,908 B2 | 9/2009 | Zhang et al. |
| 7,623,823 B2 | 11/2009 | Zito et al. |
| 7,627,477 B2 | 12/2009 | Wang et al. |
| 7,640,141 B2 | 12/2009 | Kolessar et al. |
| 7,761,602 B1 | 7/2010 | Knight et al. |
| 7,941,480 B2 | 5/2011 | Atsmon et al. |
| 7,961,881 B2 | 6/2011 | Jensen et al. |
| RE42,627 E | 8/2011 | Neuhauser et al. |
| 8,019,609 B2 | 9/2011 | Tamir et al. |
| 8,065,260 B2 | 11/2011 | Herre et al. |
| 8,069,037 B2 | 11/2011 | Singhai |
| 8,121,830 B2 | 2/2012 | Srinivasan et al. |
| 8,127,137 B2 * | 2/2012 | Levy ............... G06Q 20/401 |
| | | 348/509 |
| 8,132,224 B2 | 3/2012 | Bae et al. |
| 8,185,351 B2 | 5/2012 | Crystal et al. |
| 8,200,476 B2 | 6/2012 | Butterfield et al. |
| 8,229,159 B2 | 7/2012 | Tourapis et al. |
| 8,255,763 B1 | 8/2012 | Yang et al. |
| 8,350,971 B2 | 1/2013 | Malone et al. |
| 8,359,205 B2 | 1/2013 | Srinivasan et al. |
| 8,365,236 B2 | 1/2013 | Krikorian et al. |
| 8,369,972 B2 | 2/2013 | Topchy et al. |
| 8,554,545 B2 | 10/2013 | Srinivasan et al. |
| 8,666,528 B2 | 3/2014 | Harkness et al. |
| 8,700,407 B2 | 4/2014 | Wang et al. |
| 8,924,995 B2 | 12/2014 | Ramaswamy et al. |
| 8,965,786 B1 | 2/2015 | Frumkin et al. |
| 9,015,563 B2 | 4/2015 | Lynch et al. |
| 9,124,769 B2 | 9/2015 | Srinivasan et al. |
| 9,336,784 B2 | 5/2016 | Lynch et al. |
| 9,667,365 B2 | 5/2017 | Srinivasan et al. |
| 9,711,152 B2 | 7/2017 | Neuhauser et al. |
| 10,003,846 B2 | 6/2018 | Harkness et al. |
| 10,467,286 B2 | 11/2019 | Srinivasan et al. |
| 10,555,048 B2 | 2/2020 | Harkness et al. |
| 11,004,456 B2 | 5/2021 | Harkness et al. |
| 2001/0037232 A1 | 11/2001 | Miller |
| 2001/0044899 A1 | 11/2001 | Levy |
| 2001/0056573 A1 | 12/2001 | Kovac et al. |
| 2002/0032734 A1 | 3/2002 | Rhoads |
| 2002/0033842 A1 | 3/2002 | Zetts |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0088011 A1 | 7/2002 | Lamkin et al. |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0114490 A1 * | 8/2002 | Taniguchi ............ G06T 1/0064 |
| | | 382/100 |
| 2002/0124246 A1 | 9/2002 | Kaminsky et al. |
| 2002/0133562 A1 | 9/2002 | Newnam et al. |
| 2002/0138851 A1 | 9/2002 | Lord et al. |
| 2002/0144262 A1 | 10/2002 | Plotnick et al. |
| 2002/0144273 A1 | 10/2002 | Reto |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0196275 A1 | 12/2002 | Willner et al. |
| 2003/0004589 A1 * | 1/2003 | Bruekers ............ H04H 20/31 |
| | | 700/94 |
| 2003/0005056 A1 | 1/2003 | Yamamoto et al. |
| 2003/0021441 A1 | 1/2003 | Levy et al. |
| 2003/0039465 A1 | 2/2003 | Bjorgan et al. |
| 2003/0054757 A1 | 3/2003 | Kolessar et al. |
| 2003/0088452 A1 | 5/2003 | Kelly |

(56) References Cited

U.S. PATENT DOCUMENTS

| | | |
|---|---|---|
| 2003/0088674 A1 | 5/2003 | Ullman et al. |
| 2003/0103645 A1 | 6/2003 | Levy et al. |
| 2003/0105870 A1 | 6/2003 | Baum |
| 2003/0108200 A1 | 6/2003 | Sako |
| 2003/0115586 A1 | 6/2003 | Lejouan et al. |
| 2003/0115598 A1 | 6/2003 | Pantoja |
| 2003/0122708 A1 | 7/2003 | Percy et al. |
| 2003/0131350 A1 | 7/2003 | Peiffer et al. |
| 2003/0144899 A1 | 7/2003 | Kokubo |
| 2003/0171833 A1 | 9/2003 | Crystal et al. |
| 2003/0172375 A1 | 9/2003 | Shaw et al. |
| 2003/0177488 A1 | 9/2003 | Smith et al. |
| 2003/0185232 A1 | 10/2003 | Moore et al. |
| 2003/0191653 A1 | 10/2003 | Birnbaum et al. |
| 2003/0192060 A1 | 10/2003 | Levy |
| 2003/0195851 A1 | 10/2003 | Ong |
| 2003/0229900 A1 | 12/2003 | Reisman |
| 2004/0004630 A1 | 1/2004 | Kalva et al. |
| 2004/0006696 A1 | 1/2004 | Shin et al. |
| 2004/0008615 A1 | 1/2004 | Oh |
| 2004/0015399 A1 | 1/2004 | Maggio |
| 2004/0024588 A1 | 2/2004 | Watson et al. |
| 2004/0031058 A1 | 2/2004 | Reisman |
| 2004/0037271 A1 | 2/2004 | Liscano et al. |
| 2004/0038692 A1 | 2/2004 | Muzaffar |
| 2004/0058675 A1 | 3/2004 | Lu et al. |
| 2004/0059918 A1 | 3/2004 | Xu |
| 2004/0059933 A1 | 3/2004 | Levy |
| 2004/0064319 A1 | 4/2004 | Neuhauser et al. |
| 2004/0073916 A1 | 4/2004 | Petrovic et al. |
| 2004/0073951 A1 | 4/2004 | Bae et al. |
| 2004/0102961 A1 | 5/2004 | Jensen et al. |
| 2004/0120417 A1 | 6/2004 | Lynch et al. |
| 2004/0125125 A1 | 7/2004 | Levy |
| 2004/0128514 A1 | 7/2004 | Rhoads |
| 2004/0137929 A1 | 7/2004 | Jones et al. |
| 2004/0143844 A1 | 7/2004 | Brant et al. |
| 2004/0146161 A1 | 7/2004 | De Jong |
| 2004/0162720 A1 | 8/2004 | Jang et al. |
| 2004/0163020 A1 | 8/2004 | Sidman |
| 2004/0184369 A1 | 9/2004 | Herre et al. |
| 2004/0199387 A1 | 10/2004 | Wang et al. |
| 2004/0236819 A1 | 11/2004 | Anati et al. |
| 2004/0237114 A1 | 11/2004 | Drazin |
| 2004/0267533 A1 | 12/2004 | Hannigan et al. |
| 2005/0028189 A1 | 2/2005 | Heine et al. |
| 2005/0033758 A1 | 2/2005 | Baxter |
| 2005/0035857 A1 | 2/2005 | Zhang et al. |
| 2005/0036653 A1 | 2/2005 | Brundage et al. |
| 2005/0058319 A1 | 3/2005 | Rhoads et al. |
| 2005/0086488 A1 | 4/2005 | Kori et al. |
| 2005/0086682 A1 | 4/2005 | Burges et al. |
| 2005/0102696 A1 | 5/2005 | Westberg |
| 2005/0144004 A1 | 6/2005 | Bennett et al. |
| 2005/0144632 A1 | 6/2005 | Mears et al. |
| 2005/0169497 A1 | 8/2005 | Gustafson et al. |
| 2005/0192933 A1 | 9/2005 | Rhoads et al. |
| 2005/0216346 A1 | 9/2005 | Kusumoto et al. |
| 2005/0216509 A1 | 9/2005 | Kolessar et al. |
| 2005/0234728 A1 | 10/2005 | Tachibana et al. |
| 2005/0234731 A1 | 10/2005 | Sirivara et al. |
| 2005/0234774 A1 | 10/2005 | Dupree |
| 2005/0254453 A1 | 11/2005 | Barneah |
| 2005/0262351 A1* | 11/2005 | Levy .................. G06Q 20/401 713/176 |
| 2005/0264430 A1 | 12/2005 | Zhang et al. |
| 2005/0271246 A1 | 12/2005 | Sharma et al. |
| 2006/0041615 A1 | 2/2006 | Blank et al. |
| 2006/0059277 A1 | 3/2006 | Zito et al. |
| 2006/0083403 A1 | 4/2006 | Zhang et al. |
| 2006/0089912 A1 | 4/2006 | Spagna et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0110005 A1 | 5/2006 | Tapson |
| 2006/0111962 A1 | 5/2006 | Holsinger |
| 2006/0136549 A1 | 6/2006 | Carro |
| 2006/0136564 A1 | 6/2006 | Ambrose |
| 2006/0153041 A1 | 7/2006 | Miyashita et al. |
| 2006/0156002 A1 | 7/2006 | Bruekers et al. |
| 2006/0167747 A1 | 7/2006 | Goodman et al. |
| 2006/0168613 A1 | 7/2006 | Wood et al. |
| 2006/0212290 A1 | 9/2006 | Ide |
| 2006/0212710 A1 | 9/2006 | Baum et al. |
| 2006/0221173 A1 | 10/2006 | Duncan |
| 2006/0224798 A1 | 10/2006 | Klein et al. |
| 2006/0239502 A1 | 10/2006 | Petrovic et al. |
| 2006/0280246 A1 | 12/2006 | Alattar et al. |
| 2007/0006250 A1 | 1/2007 | Croy et al. |
| 2007/0011040 A1 | 1/2007 | Wright et al. |
| 2007/0016918 A1 | 1/2007 | Alcorn et al. |
| 2007/0038516 A1 | 2/2007 | Apple et al. |
| 2007/0052560 A1 | 3/2007 | Van Der Veen et al. |
| 2007/0055987 A1 | 3/2007 | Lu et al. |
| 2007/0061577 A1 | 3/2007 | Van de Kerkhof et al. |
| 2007/0064937 A1 | 3/2007 | Van Leest et al. |
| 2007/0070429 A1 | 3/2007 | Hein, III et al. |
| 2007/0088801 A1 | 4/2007 | Levkovitz et al. |
| 2007/0104335 A1 | 5/2007 | Shi et al. |
| 2007/0110089 A1 | 5/2007 | Essafi et al. |
| 2007/0118375 A1 | 5/2007 | Kenyon et al. |
| 2007/0124756 A1 | 5/2007 | Covell et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0143778 A1 | 6/2007 | Covell et al. |
| 2007/0149114 A1 | 6/2007 | Danilenko |
| 2007/0162927 A1 | 7/2007 | Ramaswamy et al. |
| 2007/0198738 A1 | 8/2007 | Angiolillo et al. |
| 2007/0201835 A1 | 8/2007 | Rhoads |
| 2007/0220263 A1 | 9/2007 | Ziener et al. |
| 2007/0226760 A1 | 9/2007 | Neuhauser et al. |
| 2007/0240234 A1 | 10/2007 | Watson |
| 2007/0242826 A1 | 10/2007 | Rassool |
| 2007/0250310 A1 | 10/2007 | Sato et al. |
| 2007/0250716 A1 | 10/2007 | Brunk et al. |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0019560 A1 | 1/2008 | Rhoads |
| 2008/0022114 A1 | 1/2008 | Moskowitz |
| 2008/0027734 A1 | 1/2008 | Zhao et al. |
| 2008/0028223 A1 | 1/2008 | Rhoads |
| 2008/0028474 A1 | 1/2008 | Horne et al. |
| 2008/0040354 A1 | 2/2008 | Ray et al. |
| 2008/0059160 A1 | 3/2008 | Saunders et al. |
| 2008/0065507 A1 | 3/2008 | Morrison et al. |
| 2008/0071530 A1 | 3/2008 | Ehara |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0085031 A1 | 4/2008 | Estevez et al. |
| 2008/0086304 A1 | 4/2008 | Neuhauser |
| 2008/0086553 A1 | 4/2008 | Theobald |
| 2008/0091087 A1 | 4/2008 | Neuhauser et al. |
| 2008/0091762 A1 | 4/2008 | Neuhauser et al. |
| 2008/0101454 A1 | 5/2008 | Luff et al. |
| 2008/0117975 A1 | 5/2008 | Sasai et al. |
| 2008/0126420 A1 | 5/2008 | Wright et al. |
| 2008/0133223 A1 | 6/2008 | Son et al. |
| 2008/0137749 A1 | 6/2008 | Tian et al. |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0172261 A1 | 7/2008 | Albertson et al. |
| 2008/0204273 A1 | 8/2008 | Crystal et al. |

(56) References Cited

U.S. PATENT DOCUMENTS

| | | |
|---|---|---|
| 2008/0209219 A1 | 8/2008 | Rhein |
| 2008/0209491 A1 | 8/2008 | Hasek |
| 2008/0215333 A1 | 9/2008 | Tewfik et al. |
| 2008/0219496 A1 | 9/2008 | Tewfik et al. |
| 2008/0235077 A1 | 9/2008 | Harkness et al. |
| 2008/0240490 A1 | 10/2008 | Finkelstein et al. |
| 2008/0243590 A1 | 10/2008 | Rich |
| 2008/0263359 A1* | 10/2008 | Radzishevsky .... H04N 1/32283 713/176 |
| 2008/0263620 A1 | 10/2008 | Berkvens et al. |
| 2008/0292134 A1 | 11/2008 | Sharma et al. |
| 2008/0319739 A1 | 12/2008 | Mehrotra et al. |
| 2009/0007159 A1 | 1/2009 | Rangarajan et al. |
| 2009/0031134 A1 | 1/2009 | Levy |
| 2009/0063250 A1 | 3/2009 | Burgess et al. |
| 2009/0070408 A1 | 3/2009 | White |
| 2009/0070587 A1 | 3/2009 | Srinivasan |
| 2009/0074185 A1* | 3/2009 | Srinivasan ............ G10L 19/018 380/255 |
| 2009/0119723 A1 | 5/2009 | Tinsman |
| 2009/0125310 A1 | 5/2009 | Lee et al. |
| 2009/0150553 A1 | 6/2009 | Collart et al. |
| 2009/0171767 A1 | 7/2009 | Kolessar |
| 2009/0193052 A1 | 7/2009 | Fitzgerald et al. |
| 2009/0240505 A1 | 9/2009 | Villemoes et al. |
| 2009/0252370 A1* | 10/2009 | Picard ................. H04N 19/467 382/100 |
| 2009/0259325 A1 | 10/2009 | Topchy et al. |
| 2009/0265214 A1 | 10/2009 | Jobs et al. |
| 2009/0281815 A1 | 11/2009 | Zopf |
| 2009/0306920 A1 | 12/2009 | Zwinger et al. |
| 2009/0307061 A1 | 12/2009 | Monighetti et al. |
| 2009/0307084 A1 | 12/2009 | Monighetti et al. |
| 2009/0326960 A1 | 12/2009 | Breebaat |
| 2009/0327734 A1* | 12/2009 | Aprea ................. G10L 19/018 713/176 |
| 2010/0008500 A1 | 1/2010 | Lisanke et al. |
| 2010/0027837 A1 | 2/2010 | Levy et al. |
| 2010/0030838 A1 | 2/2010 | Atsmon et al. |
| 2010/0131970 A1 | 5/2010 | Falcon |
| 2010/0134278 A1 | 6/2010 | Srinivasan et al. |
| 2010/0135638 A1 | 6/2010 | Mio |
| 2010/0166120 A1 | 7/2010 | Baum et al. |
| 2010/0206949 A1 | 8/2010 | Mattlin et al. |
| 2010/0223062 A1 | 9/2010 | Srinivasan et al. |
| 2010/0226526 A1 | 9/2010 | Modro et al. |
| 2010/0268540 A1 | 10/2010 | Arshi et al. |
| 2010/0268573 A1 | 10/2010 | Jain et al. |
| 2010/0324708 A1 | 12/2010 | Ojanpera |
| 2011/0126222 A1 | 5/2011 | Wright et al. |
| 2011/0314486 A1 | 12/2011 | Lu et al. |
| 2012/0078396 A1 | 3/2012 | Case, Jr. et al. |
| 2012/0203363 A1 | 8/2012 | Mckenna et al. |
| 2012/0203559 A1 | 8/2012 | Mckenna et al. |
| 2012/0239407 A1 | 9/2012 | Lynch et al. |
| 2012/0245978 A1 | 9/2012 | Jain et al. |
| 2012/0266187 A1 | 10/2012 | Deng |
| 2012/0278651 A1 | 11/2012 | Muralimanohar et al. |
| 2013/0096706 A1 | 4/2013 | Srinivasan et al. |
| 2014/0026159 A1 | 1/2014 | Cuttner et al. |
| 2014/0189724 A1 | 7/2014 | Harkness et al. |
| 2014/0226814 A1 | 8/2014 | Fernando |
| 2015/0039320 A1 | 2/2015 | Neuhauser et al. |
| 2015/0039321 A1 | 2/2015 | Neuhauser et al. |
| 2015/0039322 A1 | 2/2015 | Lynch et al. |
| 2015/0039972 A1 | 2/2015 | Lynch et al. |
| 2015/0221312 A1 | 8/2015 | Lynch et al. |
| 2017/0061975 A1 | 3/2017 | Srinivasan et al. |
| 2019/0074021 A1 | 3/2019 | Srinivasan et al. |
| 2020/0142927 A1 | 5/2020 | Srinivasan et al. |

FOREIGN PATENT DOCUMENTS

| | | |
|---|---|---|
| AU | 2003230993 | 11/2003 |
| AU | 2006203639 | 9/2006 |
| BR | 112901 | 6/2003 |
| BR | 309598 | 2/2005 |
| CA | 2293957 | 7/2000 |
| CA | 2483104 | 11/2003 |
| CN | 1149366 | 5/1997 |
| CN | 1282152 | 1/2001 |
| CN | 1303547 | 7/2001 |
| CN | 1372682 | 10/2002 |
| CN | 1592906 | 3/2005 |
| CN | 1647160 | 7/2005 |
| CN | 1672172 | 9/2005 |
| CN | 1795494 | 6/2006 |
| CN | 101243688 | 8/2008 |
| CN | 101361301 | 4/2009 |
| CN | 1497876 | 7/2014 |
| EP | 0713335 | 5/1996 |
| EP | 769749 | 4/1997 |
| EP | 0967803 | 12/1999 |
| EP | 1026847 | 8/2000 |
| EP | 1267572 | 12/2002 |
| EP | 0883939 | 5/2003 |
| EP | 1349370 | 10/2003 |
| EP | 1406403 | 4/2004 |
| EP | 1463220 | 9/2004 |
| EP | 2487858 | 6/2006 |
| EP | 1703460 | 9/2006 |
| EP | 1742397 | 1/2007 |
| EP | 1745464 | 10/2007 |
| EP | 1704695 | 2/2008 |
| EP | 1504445 | 8/2008 |
| EP | 1307833 | 7/2009 |
| EP | 2351271 | 12/2016 |
| JP | 2000307530 | 11/2000 |
| JP | 2002521702 | 7/2002 |
| JP | 2001040322 | 8/2002 |
| JP | 2002247610 | 8/2002 |
| JP | 2003208187 | 7/2003 |
| JP | 2003536113 | 12/2003 |
| JP | 2006154851 | 6/2006 |
| JP | 2007318745 | 12/2007 |
| WO | 9417609 | 8/1994 |
| WO | 9527349 | 10/1995 |
| WO | 9702672 | 1/1997 |
| WO | 0004662 | 1/2000 |
| WO | 0019699 | 4/2000 |
| WO | 0072309 | 11/2000 |
| WO | 0119088 | 3/2001 |
| WO | 0124027 | 4/2001 |
| WO | 0131497 | 5/2001 |
| WO | 0140963 | 6/2001 |
| WO | 0153922 | 7/2001 |
| WO | 0175743 | 10/2001 |
| WO | 0191109 | 11/2001 |
| WO | 0199109 | 12/2001 |
| WO | 0205517 | 1/2002 |
| WO | 03009277 | 1/2002 |
| WO | 0211123 | 2/2002 |
| WO | 0215081 | 2/2002 |
| WO | 0215086 | 2/2002 |
| WO | 0217591 | 2/2002 |
| WO | 0219625 | 3/2002 |
| WO | 2019625 | 3/2002 |
| WO | 0227600 | 4/2002 |
| WO | 0237381 | 5/2002 |
| WO | 02045034 | 6/2002 |
| WO | 02061652 | 8/2002 |
| WO | 02065305 | 8/2002 |
| WO | 02065318 | 8/2002 |
| WO | 02069121 | 9/2002 |
| WO | 03091990 | 11/2003 |
| WO | 03094499 | 11/2003 |
| WO | 03096337 | 11/2003 |
| WO | 2004010352 | 1/2004 |
| WO | 2004010376 | 1/2004 |
| WO | 2004040416 | 5/2004 |

(56) References Cited

FOREIGN PATENT DOCUMENTS

| | | | |
|---|---|---|---|
| WO | 2004040475 | 5/2004 | |
| WO | 2005025217 | 3/2005 | |
| WO | 2005064885 | 7/2005 | |
| WO | 2005101243 | 10/2005 | |
| WO | 2005111998 | 11/2005 | |
| WO | 2006012241 | 2/2006 | |
| WO | 2006025797 | 3/2006 | |
| WO | 2007056531 | 5/2007 | |
| WO | 2007056532 | 5/2007 | |
| WO | 2007073484 | 6/2007 | |
| WO | 2008042953 | 4/2008 | |
| WO | 2008044664 | 4/2008 | |
| WO | 2008045950 | 4/2008 | |
| WO | WO-2008072145 A1 * | 6/2008 | ........... G10L 19/018 |
| WO | 2008110002 | 9/2008 | |
| WO | 2008110790 | 9/2008 | |
| WO | 2009011206 | 1/2009 | |
| WO | 2009061651 | 5/2009 | |
| WO | 2009064561 | 5/2009 | |
| WO | 2010048458 | 4/2010 | |

OTHER PUBLICATIONS

United States Patent nd Trademark Office, "Notice of Allowance" issued in connection with U.S. Appl. No. 15/331,168, dated Jul. 3, 2018, 8 pages.

European Patent Office, "Decision to Grant", issued in connection with European Patent application No. 09748892.8, dated Oct. 11, 2016, 1 page.

The State Intellectual Property Office of China, "First Notification of Office action", issued in connection with Chinese application No. 201410725835.3, dated Dec. 12, 2016, 16 pages.

IP Australia, "Certificate of Grant", issued in connection with Australian patent application No. 2013203838, dated Dec. 22, 2016, 1 page.

Canadian Patent Office, "Office Action," issued in connection with Canadian Patent Application No. 2,741,391 dated Feb. 29, 2016, 4 pages.

European Patent Office, "Intention to Grant," issued in connection with European Patent Application No. 09748892.8 dated Jun. 9, 2016, 7 pages.

European Patent Office, "Examination Report," issued in connection with European Patent Application No. 09748893.6 dated Apr. 5, 2016, 5 pages.

IP Australia, "Notice of Grant" issued in connection with Australian Patent Application No. 2013203888, dated May 28, 2015, 2 pages.

IP Australia, "Notice of Grant" issued in connection with Australian Patent Application No. 2015202561, dated Sep. 8, 2016, 1 page.

The Government of Hong Kong Special Administrative Region Patents Registry Intellectual Property Department, "Certificate of Grant of Standard Patent," issued in connection with Hong Kong Patent Application No. 12105179.8, dated Mar. 18, 2016, 3 pages.

IP Australia, "Notice of Acceptance" issued in connection with Australian Patent Application No. 2015202561, dated May 16, 2016, 2 pages.

Canadian Patent Office, "Office Action," issued in connection with Canadian Patent Application No. 2,741,342 dated May 19, 2016, 3 Pages.

IP Australia, "Notice of Acceptance," issued in connection with Australian Patent Application No. 2013203674, dated Jan. 5, 2016, 2 pages.

European Patent Office, "Examination Report," issued in connection with European Patent Application No. 09748892.8, dated Dec. 21, 2015, 7 pages.

Canadian Patent Office, "Office Action," issued in connection with Canadian Patent Application No. 2,760,677 dated Nov. 9, 2015, 4 pages.

IP Australia, "Patent Examination Report No. 1," issued in connection with Australian Patent Application No. 2015202561, dated Sep. 22, 2015, 3 pages.

Arbitron, "Critical Band Encoding Technology Audio Encoding System From Arbitron," Document #1050-1054, Revision E, Feb. 2008, 27 pages.

Canadian Patent Office, "Office Action," issued in connection with Canadian Patent Application No. 2,760,677, dated Sep. 29, 2014, 3 pages.

Canadian Patent Office, "Office Action," issued in connection with Canadian Patent Application No. 2,741,391, dated Mar. 13, 2015, 4 pages.

Canadian Patent Office, "Office Action," issued in connection with Canadian Patent Application No. 2,741,342, dated Jun. 10, 2015, 4 pages.

European Patent Office, "Examination Report," issued in connection with European Patent Application No. 09747953.9, dated Oct. 15, 2014, 5 pages.

European Patent Office, "Communication Pursuant to Article 94(3) EPC," issued in connection with European Patent Application No. 09748893.6, dated Oct. 6, 2014, 4 pages.

International Searching Authority, "International Search Report and Written Opinion," issued in connection with International Patent Application No. PCT/US2014/049202, dated Nov. 12, 2014, 9 pages.

IP Australia, "Notice of Acceptance," issued in connection with Australian Patent Application No. 2013203888, dated Feb. 2, 2015, 2 pages.

IP Australia, "Patent Examination Report No. 1," issued in connection with Australian Patent Application No. 2013203674, dated Dec. 2, 2014, 4 pages.

IP Australia, "Patent Examination Report No. 1," issued in connection with Australian Patent Application No. 2013203820, dated Nov. 28, 2014, 3 pages.

IP Australia, "Notice of Grant," issued in connection with Australian Patent Application No. 2009308256, dated Jul. 10, 2014, 2 pages.

IP Australia, "Patent Examination Report No. 1," issued in connection with Australian Patent Application No. 2013203838, dated Nov. 24, 2014, 6 pages.

Japan Patent Office, "Notice of Final Rejection," issued in connection with Japanese Application No. 2012-508780, dated Nov. 25, 2013, 1 page.

Patents Registry, Intellectual Property Department, the Government of the Hong Kong Special Adminstrative Region, "Notice of Publication of the Registration and Grant of a Standard Patent," issued in connection with Hong Kong Patent Application No. 13101413.2, dated Jul. 17, 2015, 2 pages.

Shazam, Company summary outline and list of products, date unknown, 1 page.

State Intellectual Property Office of China, "Notice of Decision of Granting Patent Right for Invention," issued in connection with Chinese Patent Application No. 200980152518.4, dated Oct. 13, 2014, 4 pages.

State Intellectual Property Office of China, "Notice of Decision of Granting Patent Right for Invention," issued in connection with Chinese Patent Application No. 200980148637.2, dated Sep. 9, 2014, 4 pages.

State Intellectual Property Office of China, "Second Notification of Office Action," issued in connection with Chinese Patent Application No. 200980148637.2, dated Mar. 5, 2014, 9 pages.

State Intellectual Property Office of China, "Second Notification of Office Action," issued in connection with Chinese Patent Application No. 200980152527.3, dated Jan. 24, 2014, 9 pages.

State Intellectual Property Office of China, "Third Notification of Office Action," issued in connection with Chinese Patent Application No. 200980152527.3, dated Aug. 6, 2014, 13 pages.

State Intellectual Property Office of China, "Notice of Decision of Granting Patent Right for Invention," issued in connection with Chinese Patent Application No. 201080029773.2, dated Nov. 26, 2014, 4 pages.

State Intellectual Property Office of China, "Search Report," issued in connection with Chinese Patent Application No. 201080029773.2, dated Feb. 25, 2014, 2 pages.

(56) References Cited

OTHER PUBLICATIONS

State Intellectual Property Office of China, "Notice of Decision of Granting Patent Right for Invention," issued in connection with Chinese Patent Application No. 200980152527.3, dated Feb. 26, 2015, 4 pages.
Wagner, "Lexington Area Travel Data Collection Test, Global Positioning Systems for Personal Travel Surveys, Final Report," Federal Highway Administration, Sep. 15, 1997 (92 pages).
Australian Patent Office, "Notice of Acceptance," issued in connection with Australian Application No. 2009308256, dated Mar. 12, 2014, 2 pages.
Australian Patent Office, "Notice of Acceptance," issued in connection with Australian Application No. 2009308304, dated Apr. 3, 2014, 2 pages.
Australian Patent Office, "Notice of Acceptance," issued in connection with Australian Application No. 2010242814, dated Jul. 22, 2014, 3 pages.
Canadian Intellectual Property Office, "Notice of Allowance," issued in connection with Canadian Application No. 2,741,536, dated Mar. 4, 2014, 1 page.
State Intellectual Property Office of China, "Office Action", issued in connection with Chinese Application No. 200980152518.4, dated Apr. 14, 2014, 2 pages.
State Intellectual Property Office of China, "Office Action", issued in connection with Chinese Application No. 201080029773.2, dated Mar. 4, 2014, 34 pages.
Australian Patent Office, "Notice of Grant", issued in connection with Australian Application No. 2009308304, dated Jul. 31, 2014, 1 page.
Australian Patent Office, "Certificate of Grant", issued in connection with Australian Application No. 2009308304, dated Jul. 31, 2014, 1 page.
Canadian Intellectual Property Office, "Office Action," issued in connection with Application No. 2,760,677, dated Sep. 30, 2013, 3 pages.
State Intellectual Property Office of China, "First Notification of Office Action," issued in connection with Application No. 200980148637.2, dated Jul. 2, 2013, 7 pages.
State Intellectual Property Office of China, "Office Action," issued in connection with Application No. 200980152527.3, dated Jun. 24, 2013, 6 pages.
State Intellectual Property Office of China, "Search Report," issued in connection with Application No. 200980152527.3, dated Jun. 8, 2013, 2 pages.
State Intellectual Property Office of China, "First Notification of Office Action," issued in connection with Application No. 200980152518.4, dated Aug. 9, 2013, 10 pages.
State Intellectual Property Office of China, "Search Report," issued in connection with Application No. 200980152518.4, dated Jul. 31, 2013, 2 pages.
Canadian Intellectual Property Office, "Office Action," issued in connection with Application No. 2,741,342, dated Jul. 29, 2013, 3 pages.
IP Australia, "Patent Examination Report No. 2," issued in connection with Application No. 2009308304, dated Aug. 21, 2013, 6 pages.
IP Australia, "Notice of Acceptance," issued in connection with Application No. 2009308305, dated Aug. 19, 2013, 2 pages.
Japanese Patent Office, "Notice of Reasons for Rejection," issued in connection with Application No. P2012-508780, dated Jul. 2, 2013, 9 pages.
United States Patent and Trademark Office, "Notice of Allowance," issued in connection with U.S. Appl. No. 13/341,092, dated May 10, 2013, 60 pages.
Australian Patent Office, "Patent Examination Report No. 1," issued in connection with Application No. 2009308256, dated Jun. 25, 2012, 6 pages.
Australian Patent Office, "Patent Examination Report No. 1," issued in connection with Application No. 2009308305, dated Jun. 25, 2012, 5 pages.
Australian Patent Office, "Examination Report No. 1," issued in connection with Application No. 2009308304, dated Jun. 29, 2012, 11 pages.
Australian Patent Office, "Examination Report No. 1," issued in connection with Application No. 2010242814, dated May 10, 2013, 5 pages.
Australian Patent Office, "Examination Report No. 1," issued in connection with Application No. 2013203888, dated May 15, 2013, 4 pages.
Canadian Intellectual Property Office, "Notice of Allowance," issued in connection with Application No. 2,574,998, dated Aug. 10, 2010, 1 page.
Canadian Intellectual Property Office, "Office Action," issued in connection with Application No. 2,741,536, dated Feb. 22, 2013, 2 pages.
European Patent Office, "Communication Pursuant to Rules 161(1) and 162 EPC," issued in connection with Application No. 10725310.6, dated Jan. 20, 2012, 2 pages.
European Patent Office, "Examination Report," issued in connection with Application No. 10725310.6, dated Apr. 17, 2013, 7 pages.
International Bureau, "International Preliminary Report on Patentability and Written Opinion," issued in connection with International Patent Application No. PCT/US2010/033201, dated Nov. 10, 2011, 9 pages.
Japanese Patent Office, "Notice of Reasons for Rejection," issued in connection with Application No. 2011-533356, dated Jul. 31, 2012, 9 pages.
Japanese Patent Office, "Notice of Reasons for Rejection," issued in connection with Application No. 2011-533357, dated Aug. 7, 2012, 5 pages.
Japanese Patent Office, "Notice of Reasons for Rejection," issued in connection with Application No. 2011-533363, dated Oct. 2, 2012, 6 pages.
Japanese Patent Office, "Final Rejection," issued in connection with Application No. 2011-533357, dated Mar. 19, 2013, 4 pages.
Japanese Patent Office, "Final Rejection," issued in connection with Application No. 2011-533363, dated Mar. 19, 2013, 4 pages.
Japanese Patent Office, "Non-Final Rejection," issued in connection with Application No. 2011-533356, dated May 7, 2013, 5 pages.
International Searching Authority, "International Search Report," issued in connection with International Application No. PCT/US2010/033201, dated Oct. 1, 2010, 8 pages.
International Searching Authority, "Written Opinion," issued in connection with International Application No. PCT/US2010/033201, dated Oct. 1, 2010, 8 pages.
Patent Cooperation Treaty, "International Preliminary Report on Patentability and Written Opinion," in connection with International Application No. PCT/US2009/061827, dated Apr. 26, 2011, 9 pages.
Patent Cooperation Treaty, "International Preliminary Report on Patentability and Written Opinion," in connection with International Patent Application No. PCT/US2009/061749, dated Apr. 26, 2011, 10 pages.
International Searching Authority, "International Search Report and Written Opinion," issued in connection with International Patent Application Serial No. PCT/US05/26426, dated Aug. 18, 2006, 10 pages.
International Bureau, "International Preliminary Report on Patentability," issued in connection with International Patent Application Serial No. PCT/US05/26426, dated Jan. 23, 2007, 9 pages.
Canadian Intellectual Property Office, "Office Action," issued in connection with CA Application Serial No. 2,574,998, dated Aug. 26, 2008, 4 pages.
Canadian Intellectual Property Office, "Office Action," issued in connection with CA Application Serial No. 2,574,998, dated Mar. 23, 2009, 5 pages.
Canadian Intellectual Property Office, "Office Action," issued in connection with CA Application Serial No. 2,574,998, dated Nov. 13, 2009, 10 pages.
Heuer, et al., "Adaptive Multimedia Messaging based on MPEG-7—The M3-Box," Nov. 9-10, 2000, Proc. Second Int'l Symposium on Mobile Multimedia Systems Applications, pp. 6-13, 8 pages.

(56) References Cited

OTHER PUBLICATIONS

Wactlar et al., "Digital Video Archives: Managing Through Metadata" Building a National Strategy for Digital Preservation: Issues in Digital Media Archiving, Apr. 2002, pp. 84-88. [http://www.informedia.cs.cmu.edu/documents/Wactlar-CLIR-final.pdf, retrieved on Jul. 20, 2006], 14 pages.
Mulder, "The Integration of Metadata From Production to Consumer," EBU Technical Review, Sep. 2000, pp. 1-5. [http://www.ebu.ch/en/technical/trev/trev_284-contents.html, retrieved on Jul. 20, 2006], 5 pages.
Hopper, "EBU Project Group P/META Metadata Exchange Standards," EBU Technical Review, Sep. 2000, pp. 1-24. [http://www.ebu.ch/en/technical/trev/trev_284-contents.html, retrieved on Jul. 20, 2006] (24 pages).
Evain, "TV-Anytime Metadata—A Preliminary Specification on Schedule!," EBU Technical Review, Sep. 2000, pp. 1-14. [http://www.ebu.ch/en/technical/trev/trev_284-contents.html, retrieved on Jul. 20, 2006], 14 pages.
"EBU Technical Review (Editorial)," No. 284 Sep. 2000, pp. 1-3. [http://www.ebu.ch/en/technical/trev/trev_284-contents.html, retrieved on Jul. 20, 2006], 3 pages.
International Preliminary Examing Authority, "International Preliminary Examination Report," issued in connection with International Patent Application Serial No. PCT/US03/31180, dated Aug. 17, 2004, 4 pages.
International Searching Authority, "International Search Report," issued in connection with International Patent Application Serial No. PCT/US03/31180, dated Jun. 8, 2004 (5 pages).
United States Patent and Trademark Office, "Notice of Allowance and Fee(s) Due", issue in connection with U.S. Appl. No. 12/464,811, dated Jan. 20, 2017, 30 pages.
Patent Cooperation Treaty, "International Search Report," issued in connection with International Patent Application No. PCT/US2009/061749, dated May 26, 2010, 6 pages.
International Searching Authority, "Written Opinion of the International Search Report," issued in PCT/US2009/061749, dated May 26, 2010, 9 pages.
Patent Cooperation Treaty, "International Search Report," issued in connection with International Patent Application No. PCT/US2009/061750, dated Mar. 9, 2010, 3 pages.
International Searching Authority, "Written Opinion of the International Search Report," issued in connection with International Patent Application No. PCT/US2009/061750, dated Mar. 9, 2010, 7 pages.
Patent Cooperation Authority, "International Search Report," issued in connection with International Patent Application No. PCT/US2009/061827, dated May 15, 2010, 4 pages.
International Searching Authority, "Written Opinion of the International Search Report," issued in connection with International Patent Application No. PCT/US2009/061827, dated May 15, 2010, 8 pages.
Fink et al., "Social- and Interactive-Television Applications Based on Real-Time Ambient-Audio Identification," EuroITV, 2006, 10 pages.
Claburn, "Google Researchers Propose TV Monitoring," Information Week, Jun. 7, 2006, 3 pages.
Anderson, "Google to compete with Nielsen for TV-ratings info?," Ars Technica, Jun. 19, 2006, 2 pages.
Jacked, "What is Jacked?," [http://www.jacked.com/], retrieved on Dec. 3, 2009, 1 page.
Sullivan, "Google Cozies Up To SMBs For Digital Content," MediaPost News, Mar. 18, 2009, 2 pages.
Wang, "An Industrial-Strength Audio Search Algorithm," Shazam Entertainment, Ltd., in Proceedings of the Fourth International Conference on Music Information Retrieval, Baltimore, Oct. 26-30, 2003, 7 pages.
Boehret, "Yahoo Widgets Lend Brains to Boob Tube," The Wall Street Journal, Mar. 25, 2009, 3 pages.
Stross, "Apple Wouldn't Rist Its Cool Over a Gimmick, Would It?," The New York Times, Nov. 14, 2009, 3 pages.
Stultz, "Handheld Captioning at Disney World Theme Parks," article retrieved on Mar. 19, 2009, http://goflorida.about.com/od/disneyworld/a/wdw_captioning.htm, 2 pages.
Kane, "Entrepreneur Plans On-Demand Videogame Service," The Wall Street Journal, Mar. 24, 2009, 2 pages.
Shazam, "Shazam turns up the volume on mobile music," http://www.shazam.com/music/web/newsdetail.html?nid=NEWS 137, Nov. 28, 2007, 1 page.
Shazam, "Shazam and VidZone Digital Media announce UK1s first fixed price mobile download service for music videos," http://www.shazam.com/music/web/newsdetail.html?nid-NEWS136, Feb. 11, 2008, 1 page.
Shazam, "Shazam launches new music application for Facebook fans," http://www.shazam.com/music/web/newsdetail.html?nid=NEWS135, Feb. 18, 2008, 1 page.
Canadian Intellectual Property Office, "Examination Report," issued in connection with Canadian Patent Application No. 3,015,423, dated Jun. 18, 2019, 3 pages.
The State Intellectual Property Office of China, "First Notification of Office action", issued in connection with Chinese Patent application No. 201410725324.1, dated Feb. 4, 2017, 16 pages.
United States Patent and Trademark Office, "Non-Final Office action", issued in connection with U.S. Appl. No. 12/464,811, dated Aug. 31, 2012, 47 pages.
United States Patent and Trademark Office, "Non-Final Office action", issued in connection with U.S. Appl. No. 12/464,811, dated Apr. 1, 2013, 23 pages.
United States Patent and Trademark Office, "Final Office action", issued in connection with U.S. Appl. No. 12/464,811, dated Dec. 17, 2013, 41 pages.
United States Patent and Trademark Office, "Non-Final Office action", issued in connection with U.S. Appl. No. 12/464,811, dated Jul. 6, 2015, 63 pages.
United States Patent and Trademark Office, "Final Office action", issued in connection with U.S. Appl. No. 12/464,811, dated Mar. 10, 2016, 49 pages.
United States Patent and Trademark Office, "Notice of Allowance", issued in connection with U.S. Appl. No. 12/464,811, dated Sep. 23, 2016, 41 pages.
United State Patent and Trademark Office, "Notice of Allowance," issued in connection with U.S. Appl. No. 12/464,811, dated Sep. 23, 2016, 38 pages.
United State Patent and Trademark Office, "Non-Final Office Action," issued in connection with U.S. Appl. No. 13/955,438, dated Sep. 9, 2016, 13 pages.
United State Patent and Trademark Office, "Non-Final Office Action," issued in connection with U.S. Appl. No. 13/955,438, dated Jun. 6, 2015, 14 pages.
United State Patent and Trademark Office, "Final Office Action," issued in connection with U.S. Appl. No. 13/955,438, dated May 2, 2017, 14 pages.
United State Patent and Trademark Office, "Non-Final Office Action," issued in connection with U.S. Appl. No. 14/023,221, dated Aug. 31, 2016, 13 pages.
United States Patent and Trademark Office, "Non-Final Office Action," issued in connection with U.S. Appl. No. 13/955,245, dated Jun. 24, 2016, 12 pages.
United States Patent and Trademark Office, "Final Office Action," issued in connection with U.S. Appl. No. 14/195,547, dated Apr. 27, 2016, 13 pages.
United States Patent and Trademark Office, "Final Office Action," issued in connection with U.S. Appl. No. 13/708,578, dated Apr. 29, 2016, 14 pages.
United States Patent and Trademark Office, "Non-Final Office Action," issued in connection with U.S. Appl. No. 14/195,547, dated Dec. 18, 2015, 14 pages.
United States Patent and Trademark Office, "Non-Final Office Action," issued in connection with U.S. Appl. No. 13/708,578, dated Nov. 17, 2015, 12 pages.
United States Patent and Trademark Office, "Final Office Action," issued in connection with U.S. Appl. No. 14/023,221, dated Dec. 3, 2015, 11 pages.

(56) References Cited

OTHER PUBLICATIONS

United States Patent and Trademark Office, "Final Office Action," issued in connection with U.S. Appl. No. 13/955,438 dated Dec. 4, 2015, 12 pages.
United States Patent and Trademark Office, ""Notice of Allowance,"" issued in connection with U.S. Appl. No. 14/685,984 dated Dec. 18, 2015, 5 pages.
United States Patent and Trademark Office, "Non-Final Office Action," issued in connection with U.S. Appl. No. 14/023,221, dated Jun. 29, 2015, 10 pages.
United States Patent and Trademark Office, "Non-Final Office Action," issued in connection with U.S. Appl. No. 13/708,578, dated Dec. 3, 2014, 13 pages.
United States Patent and Trademark Office, "Final Office Action," issued in connection with U.S. Appl. No. 13/708,578, dated Apr. 21, 2015, 12 pages.
United States Patent and Trademark Office, "Non-Final Office Action," issued in connection with U.S. Appl. No. 10/530,233, dated May 26, 2015, 11 pages.
United States Patent and Trademark Office, "Non-Final Office Action," issued in connection with U.S. Appl. No. 14/023,226, dated Jul. 31, 2014, 6 pages.
United States Patent and Trademark Office, "Notice of Allowance," issued in connection with U.S. Appl. No. 14/023,226, dated Dec. 23, 2014, 5 pages.
United States Patent and Trademark Office, "Non-Final Office Action," issued in connection with U.S. Appl. No. 13/955,438 dated May 22, 2015, 5 pages.
United States Patent and Trademark Office, "Corrected Non-Final Office Action," issued in connection with U.S. Appl. No. 13/955,438 dated Jun. 2, 2015, 14 pages.
United States Patent and Trademark Office, "Non-Final Office Action," issued in connection with U.S. Appl. No. 13/955,245 dated Aug. 20, 2015, 15 pages.
United States Patent and Trademark Office, "Non-Final Office Action," issued in connection with U.S. Appl. No. 14/685,984 dated Jul. 31, 2015, 5 pages.
United States Patent and Trademark Office, "Final Office Action," issued in connection with U.S. Appl. No. 10/530,233, dated Sep. 18, 2015, 11 pages.
United States Patent and Trademark Office, "Advisory Action," issued in connection with U.S. Appl. No. 10/530,233, dated Feb. 20, 2014, 19 pages.
United States Patent and Trademark Office, "Final Office Action," issued in connection with U.S. Appl. No. 10/530,233, dated Nov. 7, 2013, 14 pages.
United States Patent and Trademark Office, "Notice of Allowability," issued in connection with U.S. Appl. No. 12/771,640, dated Feb. 3, 2014, 4 pages.
United States Patent and Trademark Office, "Notice of Allowance and Fee(s) Due," issued in connection with U.S. Appl. No. 12/771,640, dated Sep. 16, 2013, 25 pages.
United States Patent and Trademark Office, "Notice of Allowance and Fee(s) Due," issued in connection with U.S. Appl. No. 12/771,640, dated Oct. 22, 2013, 47 pages.
United States Patent and Trademark Office, "Supplemental Notice of Allowability," issued in connection with U.S. Appl. No. 13/341,092, dated Sep. 9, 2013, 19 pages.
United States Patent and Trademark Office, "Non-Final Office Action," issued in connection with U.S. Appl. No. 11/618,245, dated Apr. 28, 2011, 48 pages.
United States Patent and Trademark Office, "Notice of Allowance," issued in connection with parent U.S. Appl. No. 12/604,176, dated Oct. 24, 2011, 46 pages.
United States Patent and Trademark Office, "Final Office Action," issued in connection with U.S. Appl. No. 11/618,245, dated Oct. 26, 2011, 38 pages.
United States Patent and Trademark Office, "Supplemental Notice of Allowability," issued in connection with U.S. Appl. No. 12/604,176, dated Nov. 8, 2011, 6 pages.
United States Patent and Trademark Office, "Non-Final Office Action," issued in connection with U.S. Appl. No. 12/551,220, dated Apr. 26, 2012, 39 pages.
United States Patent and Trademark Office, "Non-Final Office Action," issued in connection with U.S. Appl. No. 13/341,092, dated Aug. 30, 2012, 18 pages.
United States Patent and Trademark Office, "Non-Final Office Action," issued in connection with U.S. Appl. No. 12/464,811, dated Aug. 31, 2012, 41 pages.
United States Patent and Trademark Office, "Notice of Allowance," issued in connection with U.S. Appl. No. 12/551,220, dated Dec. 5, 2012, 22 pages.
United States Patent and Trademark Office, "Non-Final Office Action," issued in connection with U.S. Appl. No. 10/530,233, dated Mar. 25, 2013, 28 pages.
United States Patent and Trademark Office, "Non-Final Office Action," issued in connection with U.S. Appl. No. 12/771,640, dated Apr. 4, 2013, 50 pages.
United States Patent and Trademark Office, "Non-final Office Action," issued in connection with U.S. Appl. No. 11/618,245, dated Feb. 5, 2009, 35 pages.
United States Patent and Trademark Office, "Final Office Action," issued in connection with U.S. Appl. No. 11/618,245, dated Jul. 21, 2009, 26 pages.
United States Patent and Trademark Office, "Advisory Action," issued in connection with U.S. Appl. No. 11/618,245, dated Sep. 30, 2009, 3 pages.
United States Patent and Trademark Office, "Non-final Office Action," issued in connection with U.S. Appl. No. 10/530,233, dated Sep. 16, 2009, 8 pages.
United States Patent and Trademark Office, "Final Office Action," issued in connection with U.S. Appl. No. 10/530,233, dated Mar. 18, 2010, 9 pages.
United States Patent and Trademark Office, "Advisory Action," issued in connection with U.S. Appl. No. 13/708,578, dated Aug. 23, 2017, 7 pages.
United States Patent and Trademark Office, "Final Office action", issued in connection with U.S. Appl. No. 14/023,221, dated Mar. 9, 2017, 14 pages.
United States Patent and Trademark Office, "Final Office Action," issued in connection with U.S. Appl. No. 13/708,578, dated Jun. 7, 2017, 17 pages.
United States Patent and Trademark Office, "Non-Final Office Action," issued in connection with U.S. Appl. No. 11/618,245, dated Jul. 3, 2013, 32 pages.
United States Patent and Trademark Office, "Final Office Action," issued in connection with U.S. Appl. No. 11/618,245, dated Dec. 31, 2013, 34 pages.
United States Patent and Trademark Office, "Non-Final Office Action," issued in connection with U.S. Appl. No. 13/708,578, dated Jan. 23, 2017, 14 pages.
United States Patent and Trademark Office, "Final Office Action," issued in connection with U.S. Appl. No. 14/195,547, dated Jun. 28, 2017, 17 pages.
Intellectual Property India, "First Examination Report," issued in connection with Indian Patent Application No. 8465/DELNP/2011, dated Jun. 28, 2017, 7 pages.
State Intellectual Property Office of China, "First Notification of Office Action," issued in connection with Chinese Patent Application No. 201510070787.3, dated Apr. 28, 2017, 18 pages.
Canadian Intellectual Property Office, "Office Action," issued in connection with Canadian Application No. 2760677, dated Nov. 21, 2016, 3 pages.
IP Australia, "Notice of Acceptance," issued in connection with Australian Patent Application No. AU 2013203838, dated Aug. 25, 2016, 2 pages.
State Intellectual Property Office of China, "Second Notification of Office Action," issued in connection with Chinese Patent Application No. 201410725835.3, dated Aug. 1, 2017, 9 pages.
European Patent Office, "Invitation pursuant to Article 94(3) and Rule 71(1) EPC", issued in connection with European patent application No. 09748893.6, dated Feb. 28, 2017, 5 pages.

(56) References Cited

OTHER PUBLICATIONS

Canadian Patent Office, "Notice of Allowance", issued in connection with Canadian Patent application No. 2,741,391, dated Mar. 10, 2017, 1 page.
Canadian Patent Office, "Office action", issued in connection with Canadian patent application No. 2,741,342, dated Apr. 3, 2017, 4 pages.
State Intellectual Property Office of China, "Notice of Decision of Granting Patent Right for Invention," issued in connection with Chinese Patent Application No. 201410725324.1, dated Oct. 10, 2017, 5 pages.
Canadian Intellectual Property Office, "Notice of Allowance", issued in connection with Canadian Patent Application No. 2,760,677, dated Dec. 18, 2017, 1 page.
Patent Cooperation Treaty, "International Preliminary Report on Patentability and Written Opinion," issued in connection with International Patent Application No. PCT/US2009/061750, dated Apr. 26, 2011, 8 pages.
United States Patent and Trademark Office, "Notice of Allowance," issued in connection with U.S. Appl. No. 16/004,111, dated Sep. 18, 2019, 21 pages.
IP Australia, "Notice of Acceptance," issued in connection to Australian Patent Application No. 2013203674, dated Jan. 5, 2016, 2 pages.
IP Australia, "Notice of Acceptance," issued in connection to Australian Patent Application No. 2013203888, dated Feb. 2, 2015, 2 pages.
IP Australia, "Patent Examination Report No. 1," issued in connection to Australian Patent Application No. 2010242814, dated May 10, 2013, 5 pages.
IP Australia, "Patent Examination Report No. 1," issued in connection to Australian Patent Application No. 2013203888, dated May 15, 2013, 4 pages.
IP Australia, "Notice of Acceptance," issued in connection to Australian Patent Application No. 2010242814, dated Jul. 22, 2014, 7 pages.
IP Australia, "Patent Examination Report No. 1," issued in connection to Australian Patent Application No. 2013203674, dated Dec. 2, 2014, 4 pages.
Canadian Intellectual Property Office, "Office Action," issued in connection with Canadian Patent Application No. 2,741,391, dated Mar. 13, 2015, 4 pages.
United States Patent and Trademark Office, "Final Office Action," issued in connection to U.S. Appl. No. 13/955,245, dated Feb. 26, 2016, 10 pages.
United States Patent and Trademark Office, "Final Office Action," issued in connection to U.S. Appl. No. 13/955,245, dated Nov. 22, 2016, 14 pages.
United States Patent and Trademark Office, "Notice of Allowance," issued in connection to U.S. Appl. No. 13/955,245, dated May 17, 2017, 9 pages.
United States Patent and Trademark Office, "Non-Final Office Action," issued in connection to U.S. Appl. No. 13/955,245, dated Aug. 20, 2015, 15 pages.
United States Patent and Trademark Office, "Non-Final Office Action," issued in connection to U.S. Appl. No. 13/955,245, dated Jun. 24, 2016, 11 pages.
United States Patent and Trademark Office, "Final Office Action," issued in connection to U.S. Appl. No. 14/023,221, dated Dec. 3, 2015, 11 pages.
United States Patent and Trademark Office, "Non-Final Office Action," issued in connection to U.S. Appl. No. 14/023,221, dated Aug. 31, 2016, 13 pages.
United States Patent and Trademark Office, "Non-Final Office Action," issued in connection to U.S. Appl. No. 14/023,221, dated Jun. 29, 2015, 10 pages.
United States Patent and Trademark Office, "Corrected Notice of Allowability," issued in connection to U.S. Appl. No. 14/195,547, dated Mar. 13, 2018, 11 pages.
United States Patent and Trademark Office, "Notice of Allowance," issued in connection to U.S. Appl. No. 15/331,168, dated Jul. 3, 2018, 8 pages.
United States Patent and Trademark Office, "Non-Final Office Action," issued in connection with U.S. Appl. No. 16/004,111, dated Apr. 29, 2019, 16 pages.
United States Patent and Trademark Office, "Notice of Allowance," issued in connection with U.S. Appl. No. 16/004,111, dated Sep. 18, 2019, 7 pages.
United States Patent and Trademark Office, "Notice of Allowability," issued in connection with U.S. Appl. No. 16/004,111, dated Nov. 26, 2019, 4 pages.
United States Patent and Trademark Office, "Non-Final Office Action," issued in connection with U.S. Appl. No. 16/426,803, dated Jan. 21, 2020, 6 pages.
State Intellectual Property Office of China, "Notice of Completion of Formalities for Patent Registration," issued in connection with Chinese Patent Application No. 201410725324.1, dated Oct. 10, 2017, 5 pages.
State Intellectual Property Office of China, "Notification of Reexamination," issued in connection with Chines Patent Application No. 201510070787.3, dated May 14, 2019, 14 pages.
States Intellectual Property Office of China, "Reasons for Rejection," issued in connection with Chinese Patent Application No. 201510070787.3, dated Oct. 8, 2018, 12 pages.
States Intellectual Property Office of China, "Notification of Reexamination," issued in connection with Chinese Patent Application No. 201510070787.3, dated Jul. 22, 2019, 17 pages.
States Intellectual Property Office of China, "Second Office Action," issued in connection with Chinese Patent Application No. 201510070787.3, dated Dec. 4, 2017, 8 pages.
Canadian Intellectual Property Office, "Office Action," issued in connection with Canadian Patent Application No. 3,008,502, dated Apr. 26, 2019, 4 pages.
State Intellectual Property Office in China, "Notice of Completion of Formalities for Patent Registration," issued in connection with Chinese Patent Application No. 201410725835.3, dated May 31, 2018, 4 pages.
"What is Jacked?" [http://www.jacked.com/], Dec. 3, 2009, 1 page.
European Patent Office, "Summons to attend oral proceedings pursuant to Rule 115(1) EPC," issued in connection with application No. 09748893.6, dated Sep. 21, 2016, 5 pages.
United States Patent and Trademark Office, "Non-Final Office Action," dated Nov. 29, 2018 in connection with U.S. Appl. No. 15/698,373, 10 pages.
United States Patent and Trademark Office, "Final Office Action," dated Apr. 10, 2019 in connection with U.S. Appl. No. 15/698,373, 7 pages.
United States Patent and Trademark Office, "Notice of Allowance," dated Jun. 26, 2019 in connection with U.S. Appl. No. 15/698,373, 8 pages.
United States Patent and Trademark Office, "Notice of Allowability," dated Aug. 23, 2019 in connection with U.S. Appl. No. 15/698,373, 2 pages.
United States Patent and Trademark Office, "Notice of Allowability," dated Sep. 12, 2019 in connection with U.S. Appl. No. 15/698,373, 2 pages.
Canadian Intellectual Property Office, "Office Action," issued in connection with Canadian Patent Application No. 3,015,423, dated Jun. 5, 2020, 3 pages.
European Patent Office, "Decision to grant a European patent," issued in connection with European Patent Application No. 09748893. 6, dated Jul. 26, 2018, 2 pages.
European Patent Office, "Extended European Search Report," issued in connection with European Patent Application No. 18183643.8, dated Aug. 24, 2018, 8 pages.
IP Australia, "Examination Report No. 2," dated Jul. 29, 2016 in connection with Australian Patent Application No. 2013203838, 4 pages.
European Patent Office, "Communication Pursuant to Article 94(3) EPC," dated Feb. 11, 2021 in connection with European Patent Application No. 18183643.8, 5 pages.

(56) References Cited

OTHER PUBLICATIONS

United States Patent and Trademark Office, "Final Office Action," dated Apr. 21, 2021 in connection with U.S. Appl. No. 16/672,128, 13 pages.
United States Patent and Trademark Office, "Non-Final Office Action," dated Dec. 10, 2020 in connection with U.S. Appl. No. 16/672,128, 8 pages.
United States Patent and Trademark Office, "Notice of Allowance," dated Oct. 13, 2021 in connection with U.S. Appl. No. 16/672,128, 10 pages.
Canadian Intellectual Property Office, "Office Action," dated Oct. 25, 2021 in connection with Canadian Patent Application No. 3,094,520, 5 pages.
Intellectual Property India, "Intimation of Grant," dated Dec. 21, 2020 in connection with Indian Patent Application No. 8465/DELNP/2011, 1 page.
United States Patent and Trademark Office, "Notice of Allowance," dated Jun. 17, 2020 in connection with U.S. Appl. No. 16/426,803, 7 pages.
United States Patent and Trademark Office, "Notice of Allowance," dated Jan. 12, 2021 in connection with U.S. Appl. No. 16/426,803, 9 pages.
United States Patent and Trademark Office, "Supplemental Notice of Allowability," dated Sep. 1, 2020 in connection with U.S. Appl. No. 16/426,803, 4 pages.
United States Patent and Trademark Office, "Non-Final Office Action," dated Feb. 22, 2021 in connection with U.S. Appl. No. 16/779,212, 11 pages.
United States Patent and Trademark Office, "Final Office Action," dated Sep. 3, 2021 in connection with U.S. Appl. No. 16/779,212, 12 pages.
United States Patent and Trademark Office, "Non-Final Office Action," dated Jan. 24, 2022 in connection with U.S. Appl. No. 16/779,212, 12 pages.
United States Patent and Trademark Office, "Final Office Action," dated Feb. 26, 2016 in connection with U.S. Appl. No. 13/955,245, 10 pages.
United States Patent and Trademark Office, "Final Office Action," dated May 2, 2017 in connection with U.S. Appl. No. 13/955,438, 14 pages.
International Searching Authority, "International Preliminary Report on Patentability," dated Feb. 2, 2016 in connection with International Patent Application No. PCT/US2014/049202, 4 pages.

\* cited by examiner

| Symbols | Frequency Indices | | | | | | |
|---|---|---|---|---|---|---|---|
| 0 | 188 | 296 | 360 | 403 | 469 | 546 | 614 |
| 1 | 216 | 252 | 360 | 437 | 473 | 579 | 615 |
| 2 | 216 | 253 | 361 | 438 | 474 | 578 | 614 |
| 3 | 216 | 254 | 362 | 439 | 475 | 577 | 613 |
| 4 | 216 | 255 | 363 | 440 | 476 | 576 | 612 |
| 5 | 216 | 257 | 365 | 432 | 468 | 584 | 620 |
| 6 | 216 | 258 | 366 | 433 | 469 | 583 | 619 |
| 7 | 216 | 259 | 367 | 434 | 470 | 582 | 618 |
| 8 | 216 | 260 | 368 | 435 | 471 | 581 | 617 |
| 9 | 216 | 288 | 324 | 401 | 509 | 543 | 651 |
| 10 | 216 | 289 | 325 | 402 | 510 | 542 | 650 |
| 11 | 216 | 290 | 326 | 403 | 511 | 541 | 649 |
| 12 | 216 | 291 | 327 | 404 | 512 | 540 | 648 |
| 13 | 216 | 293 | 329 | 396 | 504 | 548 | 656 |
| 14 | 216 | 294 | 330 | 397 | 505 | 547 | 655 |
| 15 | 216 | 295 | 331 | 398 | 506 | 546 | 654 |
| 16 | 216 | 296 | 332 | 399 | 507 | 545 | 653 |
| 17 | 217 | 252 | 361 | 439 | 476 | 584 | 619 |
| 18 | 217 | 253 | 360 | 440 | 475 | 583 | 620 |
| 19 | 217 | 254 | 363 | 437 | 474 | 582 | 617 |
| 20 | 217 | 255 | 362 | 438 | 473 | 581 | 618 |
| 21 | 217 | 257 | 366 | 434 | 471 | 579 | 614 |
| 22 | 217 | 258 | 365 | 435 | 470 | 578 | 615 |
| 23 | 217 | 259 | 368 | 432 | 469 | 577 | 612 |
| 24 | 217 | 260 | 367 | 433 | 468 | 576 | 613 |
| 25 | 217 | 288 | 325 | 403 | 512 | 548 | 655 |
| 26 | 217 | 289 | 324 | 404 | 511 | 547 | 656 |
| 27 | 217 | 290 | 327 | 401 | 510 | 546 | 653 |
| 28 | 217 | 291 | 326 | 402 | 509 | 545 | 654 |
| 29 | 217 | 293 | 330 | 398 | 507 | 543 | 650 |
| 30 | 217 | 294 | 329 | 399 | 506 | 542 | 651 |
| 31 | 217 | 295 | 332 | 396 | 505 | 541 | 648 |
| 32 | 217 | 296 | 331 | 397 | 504 | 540 | 649 |
| 33 | 218 | 252 | 362 | 440 | 474 | 543 | 649 |
| 34 | 218 | 253 | 363 | 439 | 473 | 542 | 648 |
| 35 | 218 | 254 | 360 | 438 | 476 | 541 | 651 |
| 36 | 218 | 255 | 361 | 437 | 475 | 540 | 650 |
| 37 | 218 | 257 | 367 | 435 | 469 | 548 | 654 |
| 38 | 218 | 258 | 368 | 434 | 468 | 547 | 653 |
| 39 | 218 | 259 | 365 | 433 | 471 | 546 | 656 |
| 40 | 218 | 260 | 366 | 432 | 470 | 545 | 655 |
| 41 | 218 | 288 | 326 | 404 | 510 | 579 | 613 |
| 42 | 218 | 289 | 327 | 403 | 509 | 578 | 612 |

FIG. 3

| Symbols | Frequency Indices | | | | | | |
|---|---|---|---|---|---|---|---|
| 43 | 218 | 290 | 324 | 402 | 512 | 577 | 615 |
| 44 | 218 | 291 | 325 | 401 | 511 | 576 | 614 |
| 45 | 218 | 293 | 331 | 399 | 505 | 584 | 618 |
| 46 | 218 | 294 | 332 | 398 | 504 | 583 | 617 |
| 47 | 218 | 295 | 329 | 397 | 507 | 582 | 620 |
| 48 | 218 | 296 | 330 | 396 | 506 | 581 | 619 |
| 49 | 219 | 252 | 363 | 438 | 475 | 548 | 653 |
| 50 | 219 | 253 | 362 | 437 | 476 | 547 | 654 |
| 51 | 219 | 254 | 361 | 440 | 473 | 546 | 655 |
| 52 | 219 | 255 | 360 | 439 | 474 | 545 | 656 |
| 53 | 219 | 257 | 368 | 433 | 470 | 543 | 648 |
| 54 | 219 | 258 | 367 | 432 | 471 | 542 | 649 |
| 55 | 219 | 259 | 366 | 435 | 468 | 541 | 650 |
| 56 | 219 | 260 | 365 | 434 | 469 | 540 | 651 |
| 57 | 219 | 288 | 327 | 402 | 511 | 584 | 617 |
| 58 | 219 | 289 | 326 | 401 | 512 | 583 | 618 |
| 59 | 219 | 290 | 325 | 404 | 509 | 582 | 619 |
| 60 | 219 | 291 | 324 | 403 | 510 | 581 | 620 |
| 61 | 219 | 293 | 332 | 397 | 506 | 579 | 612 |
| 62 | 219 | 294 | 331 | 396 | 507 | 578 | 613 |
| 63 | 219 | 295 | 330 | 399 | 504 | 577 | 614 |
| 64 | 219 | 296 | 329 | 398 | 505 | 576 | 615 |
| 65 | 221 | 252 | 365 | 401 | 504 | 582 | 613 |
| 66 | 221 | 253 | 366 | 402 | 505 | 581 | 612 |
| 67 | 221 | 254 | 367 | 403 | 506 | 584 | 615 |
| 68 | 221 | 255 | 368 | 404 | 507 | 583 | 614 |
| 69 | 221 | 257 | 360 | 396 | 509 | 577 | 618 |
| 70 | 221 | 258 | 361 | 397 | 510 | 576 | 617 |
| 71 | 221 | 259 | 362 | 398 | 511 | 579 | 620 |
| 72 | 221 | 260 | 363 | 399 | 512 | 578 | 619 |
| 73 | 221 | 288 | 329 | 437 | 468 | 546 | 649 |
| 74 | 221 | 289 | 330 | 438 | 469 | 545 | 648 |
| 75 | 221 | 290 | 331 | 439 | 470 | 548 | 651 |
| 76 | 221 | 291 | 332 | 440 | 471 | 547 | 650 |
| 77 | 221 | 293 | 324 | 432 | 473 | 541 | 654 |
| 78 | 221 | 294 | 325 | 433 | 474 | 540 | 653 |
| 79 | 221 | 295 | 326 | 434 | 475 | 543 | 656 |
| 80 | 221 | 296 | 327 | 435 | 476 | 542 | 655 |
| 81 | 222 | 252 | 366 | 403 | 507 | 577 | 617 |
| 82 | 222 | 253 | 365 | 404 | 506 | 576 | 618 |
| 83 | 222 | 254 | 368 | 401 | 505 | 579 | 619 |
| 84 | 222 | 255 | 367 | 402 | 504 | 578 | 620 |
| 85 | 222 | 257 | 361 | 398 | 512 | 582 | 612 |

FIG. 4

| Symbols | Frequency Indices | | | | | | |
|---|---|---|---|---|---|---|---|
| 86 | 222 | 258 | 360 | 399 | 511 | 581 | 613 |
| 87 | 222 | 259 | 363 | 396 | 510 | 584 | 614 |
| 88 | 222 | 260 | 362 | 397 | 509 | 583 | 615 |
| 89 | 222 | 288 | 330 | 439 | 471 | 541 | 653 |
| 90 | 222 | 289 | 329 | 440 | 470 | 540 | 654 |
| 91 | 222 | 290 | 332 | 437 | 469 | 543 | 655 |
| 92 | 222 | 291 | 331 | 438 | 468 | 542 | 656 |
| 93 | 222 | 293 | 325 | 434 | 476 | 546 | 648 |
| 94 | 222 | 294 | 324 | 435 | 475 | 545 | 649 |
| 95 | 222 | 295 | 327 | 432 | 474 | 548 | 650 |
| 96 | 222 | 296 | 326 | 433 | 473 | 547 | 651 |
| 97 | 223 | 252 | 367 | 404 | 505 | 546 | 651 |
| 98 | 223 | 253 | 368 | 403 | 504 | 545 | 650 |
| 99 | 223 | 254 | 365 | 402 | 507 | 548 | 649 |
| 100 | 223 | 255 | 366 | 401 | 506 | 547 | 648 |
| 101 | 223 | 257 | 362 | 399 | 510 | 541 | 656 |
| 102 | 223 | 258 | 363 | 398 | 509 | 540 | 655 |
| 103 | 223 | 259 | 360 | 397 | 512 | 543 | 654 |
| 104 | 223 | 260 | 361 | 396 | 511 | 542 | 653 |
| 105 | 223 | 288 | 331 | 440 | 469 | 582 | 615 |
| 106 | 223 | 289 | 332 | 439 | 468 | 581 | 614 |
| 107 | 223 | 290 | 329 | 438 | 471 | 584 | 613 |
| 108 | 223 | 291 | 330 | 437 | 470 | 583 | 612 |
| 109 | 223 | 293 | 326 | 435 | 474 | 577 | 620 |
| 110 | 223 | 294 | 327 | 434 | 473 | 576 | 619 |
| 111 | 223 | 295 | 324 | 433 | 476 | 579 | 618 |
| 112 | 223 | 296 | 325 | 432 | 475 | 578 | 617 |
| 113 | 224 | 252 | 368 | 402 | 506 | 541 | 655 |
| 114 | 224 | 253 | 367 | 401 | 507 | 540 | 656 |
| 115 | 224 | 254 | 366 | 404 | 504 | 543 | 653 |
| 116 | 224 | 255 | 365 | 403 | 505 | 542 | 654 |
| 117 | 224 | 257 | 363 | 397 | 511 | 546 | 650 |
| 118 | 224 | 258 | 362 | 396 | 512 | 545 | 651 |
| 119 | 224 | 259 | 361 | 399 | 509 | 548 | 648 |
| 120 | 224 | 260 | 360 | 398 | 510 | 547 | 649 |
| 121 | 224 | 288 | 332 | 438 | 470 | 577 | 619 |
| 122 | 224 | 289 | 331 | 437 | 471 | 576 | 620 |
| 123 | 224 | 290 | 330 | 440 | 468 | 579 | 617 |
| 124 | 224 | 291 | 329 | 439 | 469 | 578 | 618 |
| 125 | 224 | 293 | 327 | 433 | 475 | 582 | 614 |
| 126 | 224 | 294 | 326 | 432 | 476 | 581 | 615 |
| 127 | 224 | 295 | 325 | 435 | 473 | 584 | 612 |

FIG. 5

| AAC CRITICAL BAND INDEX | SHORT BLOCK (512 SAMPLES) INDEX RANGE | LONG BLOCK (9216 SAMPLES) INDEX RANGE |
|---|---|---|
| 5 | 10,11 | 180-216 |
| 6 | 12,13 | 217-252 |
| 7 | 14,15 | 253-288 |
| 8 | 16,17 | 289-324 |
| 9 | 18,19 | 325-360 |
| 10 | 20,21 | 361-396 |
| 11 | 22,23 | 397-432 |
| 12 | 24,25 | 433-468 |
| 13 | 26,27 | 469-504 |
| 14 | 28,29 | 505-540 |
| 15 | 30,31 | 541-576 |
| 16 | 32,33 | 577-612 |
| 17 | 34,35 | 613-648 |
| 17 | 36,37 | 649-684 |

FIG. 9

| SLIDING INDEX | 0 | 1 | 2 | 3 | 4 | 5 | 6 | 7 | SAMPLE INDEX |
|---|---|---|---|---|---|---|---|---|---|
| 0 | | | | | | | | | |
| ... | | | | | | | | | |
| 3 | 129 | 129 | 32 | 129 | 35 | 129 | 129 | 129 | 35400 |
| ... | | | | | | | | | |
| 37 | 37 | 23 | 47 | 0 | 128 | 57 | 22 | 111 | 35672 |
| 38 | 37 | 23 | 47 | 0 | 128 | 57 | 22 | 111 | 35680 |
| 39 | 37 | 23 | 47 | 0 | 128 | 57 | 22 | 111 | 35688 |
| ... | | | | | | | | | |
| 191 | 129 | 129 | 129 | 129 | 129 | 129 | 129 | 129 | 36904 |

↑ CURRENT LOCATION (column 3)

| SLIDING INDEX | 0 | 1 | SAMPLE INDEX |
|---|---|---|---|
| 0 | | | |
| ... | | | |
| 3 | 129 | 129 | 38472 |
| ... | | | |
| 37 | 254 | 68 | 38744 |
| 38 | 254 | 68 | 38752 |
| 39 | 254 | 68 | 38760 |
| ... | | | |
| 191 | 129 | 129 | 39976 |

↑ CURRENT LOCATION (column 1)

| MESSAGE INDEX | D0 | D1 | D2 | D3 | D4 | D5 | D6 | SAMPLE INDEX | VALIDATION FLAG |
|---|---|---|---|---|---|---|---|---|---|
| M0 | 57 | 22 | 111 | 37 | 23 | 47 | 0 | 35680 | VALIDATED |
|  |  |  |  |  |  |  |  |  |  |
|  |  |  |  |  |  |  |  |  |  |
|  |  |  |  |  |  |  |  |  |  |
| M7 | 57 | 13 | 111 | 37 | 23 | 33 | 3 | 67670 | PARTIALLY VALIDATED |
|  |  |  |  |  |  |  |  |  |  |

FIG. 19

METHODS AND APPARATUS TO PERFORM AUDIO WATERMARKING AND WATERMARK DETECTION AND EXTRACTION

RELATED APPLICATIONS

This patent arises from a continuation of U.S. patent application Ser. No. 15/331,168, filed Oct. 21, 2016, now U.S. Pat. No. 10,134,408, entitled "METHODS AND APPARATUS TO PERFORM AUDIO WATERMARKING AND WATERMARK DETECTION AND EXTRACTION," which is a continuation of U.S. patent application Ser. No. 12/464,811, filed May 12, 2009, now U.S. Pat. No. 9,667,365, entitled "METHODS AND APPARATUS TO PERFORM AUDIO WATERMARKING AND WATERMARK DETECTION AND EXTRACTION," which claims priority to and the benefit of U.S. Provisional Application Ser. No. 61/174,708 filed May 1, 2009, entitled "METHODS AND APPARATUS TO PERFORM AUDIO WATERMARKING AND WATERMARK DETECTION AND EXTRACTION" and U.S. Provisional Application Ser. No. 61/108,380, filed Oct. 24, 2008, entitled "STACKING METHOD FOR ADVANCED WATERMARK DETECTION." Priority to U.S. patent application Ser. No. 15/331, 168, U.S. patent application Ser. No. 12/464,811, U.S. Provisional Application Ser. No. 61/174,708, and U.S. Provisional Application Ser. No. 61/108,380 is hereby claimed. U.S. patent application Ser. No. 15/331,168, U.S. patent application Ser. No. 12/464,811, U.S. Provisional Application Ser. No. 61/174,708, and U.S. Provisional Patent Application Ser. No. 61/108,380 are incorporated by reference in their entireties.

TECHNICAL FIELD

The present disclosure relates generally to media monitoring and, more particularly, to methods and apparatus to perform audio watermarking and watermark detection and extraction.

BACKGROUND

Identifying media information and, more specifically, audio streams (e.g., audio information) is useful for assessing audience exposure to television, radio, or any other media. For example, in television audience metering applications, a code may be inserted into the audio or video of media, wherein the code is later detected at monitoring sites when the media is presented (e.g., played at monitored households). The information payload of the code/watermark embedded into original signal can consist of unique source identification, time of broadcast information, transactional information or additional content metadata.

Monitoring sites typically include locations such as, for example, households where the media consumption of audience members or audience member exposure to the media is monitored. For example, at a monitoring site, codes from the audio and/or video are captured and may be associated with audio or video streams of media associated with a selected channel, radio station, media source, etc. The collected codes may then be sent to a central data collection facility for analysis. However, the collection of data pertinent to media exposure or consumption need not be limited to in-home exposure or consumption.

BRIEF DESCRIPTION OF THE DRAWINGS

FIG. 3 is a flow diagram illustrating an example encoding process that may be carried out by the example decoder of FIG. 2.

FIG. 4 is a flow diagram illustrating an example process that may be carried to generate a frequency index table used in conjunction with the code frequency selector of FIG. 2.

FIG. 5 is a chart illustrating critical band indices and how they correspond to short and long block sample indices.

FIGS. 7-9 are charts illustrating different example code frequency configurations that may be generated by the process of FIG. 4 and used in conjunction with the code frequency selector of FIG. 2.

FIG. 16 illustrates an example set of circular buffers that may store message symbols.

FIG. 17 illustrates an example set of pre-existing code flag circular buffers that may store message symbols.

FIG. 19 illustrates an example filter stack that may store identified messages in the decoder of FIG. 11.

DETAILED DESCRIPTION

Figure 1:
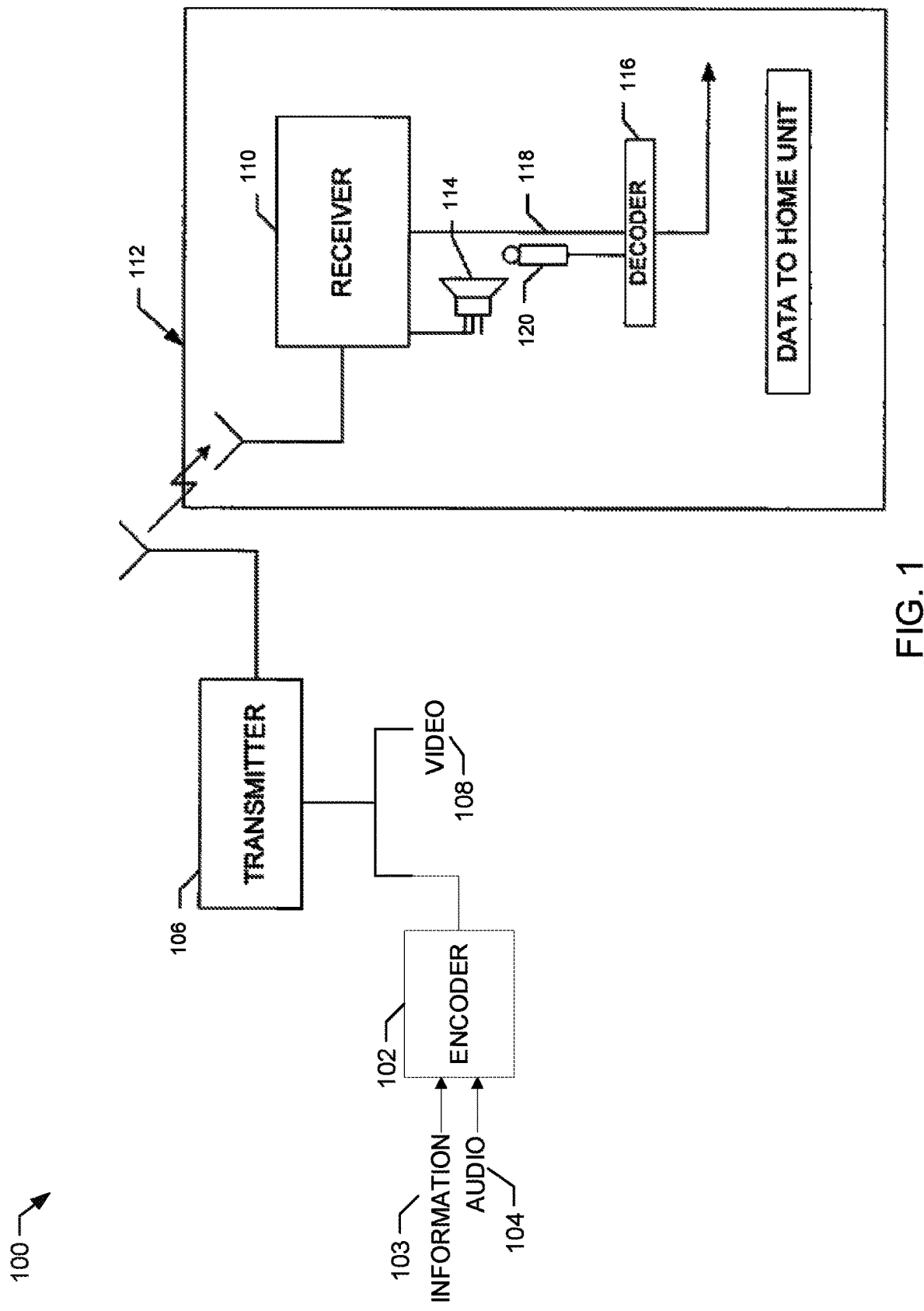
FIG. 1 is a schematic depiction of a broadcast audience measurement system employing a program identifying code added to the audio portion of a composite television signal.

The following description makes reference to audio encoding and decoding that is also commonly known as audio watermarking and watermark detection, respectively. It should be noted that in this context, audio may be any type of signal having a frequency falling within the normal human audibility spectrum. For example, audio may be speech, music, an audio portion of an audio and/or video program or work (e.g., a television program, a movie, an Internet video, a radio program, a commercial spot, etc.), a media program, noise, or any other sound.

In general, as described in detail below, the encoding of the audio inserts one or more codes or information (e.g., watermarks) into the audio and, ideally, leaves the code inaudible to hearers of the audio. However, there may be certain situations in which the code may be audible to certain listeners. The codes that are embedded in audio may be of any suitable length and any suitable technique for assigning the codes to information may be selected.

As described below, the codes or information to be inserted into the audio may be converted into symbols that will be represented by code frequency signals to be embedded in the audio to represent the information. The code frequency signals include one or more code frequencies, wherein different code frequencies or sets of code frequencies are assigned to represent different symbols of information. Techniques for generating one or more tables mapping symbols to representative code frequencies such that symbols are distinguishable from one another at the decoder are also described. Any suitable encoding or error correcting technique may be used to convert codes into symbols.

By controlling the amplitude at which these code frequency signals are input into the native audio, the presence of the code frequency signals can be imperceptible to human hearing. Accordingly, in one example, masking operations based on the energy content of the native audio at different frequencies and/or the tonality or noise-like nature of the native audio are used to provide information upon which the amplitude of the code frequency signals is based.

Additionally, it is possible that an audio signal has passed through a distribution chain, where, for example, the content has passed from a content originator to a network distributor (e.g., NBC national) and further passed to a local content distributor (e.g., NBC in Chicago). As the audio signal passes through the distribution chain, one of the distributors may encode a watermark into the audio signal in accordance with the techniques described herein, thereby including in the audio signal an indication of that distributors identity or the time of distribution. The encoding described herein is very robust and, therefore, codes inserted into the audio signal are not easily removed. Accordingly, any subsequent distributors of the audio content may use techniques described herein to encode the previously encoded audio signal in a manner such that the code of the subsequent distributor will be detectable and any crediting due that subsequent distributor will be acknowledged.

Additionally, due to the repetition or partial repetition of codes within a signal, code detection can be improved by stacking messages and transforming the encoded audio signal into a signal having an accentuated code. As the audio signal is sampled at a monitored location, substantially equal sized blocks of audio samples are summed and averaged. This stacking process takes advantage of the temporal properties of the audio signal to cause the code signal to be accentuated within the audio signal. Accordingly, the stacking process, when used, can provide increased robustness to noise or other interference. For example, the stacking process may be useful when the decoding operation uses a microphone that might pick up ambient noise in addition to the audio signal output by a speaker.

A further technique to add robustness to the decoding operations described herein provides for validation of messages identified by a decoding operation. After messages are identified in an encoded audio signal, the messages are added to a stack. Subsequent repetitions of messages are then compared to identify matches. When a message can be matched to another message identified at the proper repetition interval, the messages are identified as validated. When a message can be partially matched to another message that has already been validated, the message is marked as partially validated and subsequent messages are used to identify parts of the message that may have been corrupted. According to this example validation technique, messages are only output from the decoder if they can be validated. Such a technique prevents errors in messages caused by interference and/or detection errors.

The following examples pertain generally to encoding an audio signal with information, such as a code, and obtaining that information from the audio via a decoding process. The following example encoding and decoding processes may be used in several different technical applications to convey information from one place to another.

The example encoding and decoding processes described herein may be used to perform broadcast identification. In such an example, before a work is broadcast, that work is encoded to include a code indicative of the source of the work, the broadcast time of the work, the distribution channel of the work, or any other information deemed relevant to the operator of the system. When the work is presented (e.g., played through a television, a radio, a computing device, or any other suitable device), persons in the area of the presentation are exposed not only to the work, but, unbeknownst to them, are also exposed to the code embedded in the work. Thus, persons may be provided with decoders that operate on a microphone-based platform so that the work may be obtained by the decoder using free-field detection and processed to extract codes therefrom. The codes may then be logged and reported back to a central facility for further processing. The microphone-based decoders may be dedicated, stand-alone devices, or may be implemented using cellular telephones or any other types of devices having microphones and software to perform the decoding and code logging operations. Alternatively, wire-based systems may be used whenever the work and its attendant code may be picked up via a hard wired connection.

The example encoding and decoding processes described herein may be used, for example, in tracking and/or forensics related to audio and/or video works by, for example, marking copyrighted audio and/or associated video content with a particular code. The example encoding and decoding processes may be used to implement a transactional encoding system in which a unique code is inserted into a work when that work is purchased by a consumer. Thus, allowing a media distribution to identify a source of a work. The purchasing may include a purchaser physically receiving a tangible media (e.g., a compact disk, etc.) on which the work is included, or may include downloading of the work via a network, such as the Internet. In the context of transactional encoding systems, each purchaser of the same work receives the work, but the work received by each purchaser is encoded with a different code. That is, the code inserted in the work may be personal to the purchaser, wherein each work purchased by that purchaser includes that purchaser's code. Alternatively, each work may be may be encoded with a code that is serially assigned.

Furthermore, the example encoding and decoding techniques described herein may be used to carry out control functionality by hiding codes in a steganographic manner, wherein the hidden codes are used to control target devices programmed to respond to the codes. For example, control data may be hidden in a speech signal, or any other audio signal. A decoder in the area of the presented audio signal processes the received audio to obtain the hidden code. After obtaining the code, the target device takes some predetermined action based on the code. This may be useful, for example, in the case of changing advertisements within stores based on audio being presented in the store, etc. For example, scrolling billboard advertisements within a store may be synchronized to an audio commercial being presented in the store through the use of codes embedded in the audio commercial.

An example encoding and decoding system 100 is shown in FIG. 1. The example system 100 may be, for example, a television audience measurement system, which will serve as a context for further description of the encoding and decoding processes described herein. The example system 100 includes an encoder 102 that adds a code or information 103 to an audio signal 104 to produce an encoded audio signal. The information 103 may be any selected information. For example, in a media monitoring context, the information 103 may be representative of an identity of a broadcast media program such as a television broadcast, a radio broadcast, or the like. Additionally, the information 103 may include timing information indicative of a time at which the information 103 was inserted into audio or a media broadcast time. Alternatively, the code may include control information that is used to control the behavior of one or more target devices.

The audio signal 104 may be any form of audio including, for example, voice, music, noise, commercial advertisement audio, audio associated with a television program, live performance, etc. In the example of FIG. 1, the encoder 102 passes the encoded audio signal to a transmitter 106. The transmitter 106 transmits the encoded audio signal along with any video signal 108 associated with the encoded audio signal. While, in some instances, the encoded audio signal may have an associated video signal 108, the encoded audio signal need not have any associated video.

In one example, the audio signal 104 is a digitized version of an analog audio signal, wherein the analog audio signal has been sampled at 48 kilohertz (KHz). As described below in detail, two seconds of audio, which correspond to 96,000 audio samples at the 48 KHz sampling rate, may be used to carry one message, which may be a synchronization message and 49 bits of information. Using an encoding scheme of 7 bits per symbol, the message requires transmission of eight symbols of information. Alternatively, in the context of overwriting described below, one synchronization symbol is used and one information symbol conveying one of 128 states follows the synchronization symbol. As described below in detail, according to one example, one 7-bit symbol of information is embedded in a long block of audio samples, which corresponds to 9216 samples. In one example, such a long block includes 36 overlapping short blocks of 256 samples, wherein in a 50% overlapping block 256 of the samples are old and 256 samples are new.

Although the transmit side of the example system 100 shown in FIG. 1 shows a single transmitter 106, the transmit side may be much more complex and may include multiple levels in a distribution chain through which the audio signal 104 may be passed. For example, the audio signal 104 may be generated at a national network level and passed to a local network level for local distribution. Accordingly, although the encoder 102 is shown in the transmit lineup prior to the transmitter 106, one or more encoders may be placed throughout the distribution chain of the audio signal 104. Thus, the audio signal 104 may be encoded at multiple levels and may include embedded codes associated with those multiple levels. Further details regarding encoding and example encoders are provided below.

The transmitter 106 may include one or more of a radio frequency (RF) transmitter that may distribute the encoded audio signal through free space propagation (e.g., via terrestrial or satellite communication links) or a transmitter used to distribute the encoded audio signal through cable, fiber, etc. In one example, the transmitter 106 may be used to broadcast the encoded audio signal throughout a broad geographical area. In other cases, the transmitter 106 may distribute the encoded audio signal through a limited geographical area. The transmission may include up-conversion of the encoded audio signal to radio frequencies to enable propagation of the same. Alternatively, the transmission may include distributing the encoded audio signal in the form of digital bits or packets of digital bits that may be transmitted over one or more networks, such as the Internet, wide area networks, or local area networks. Thus, the encoded audio signal may be carried by a carrier signal, by information packets or by any suitable technique to distribute the audio signals.

When the encoded audio signal is received by a receiver 110, which, in the media monitoring context, may be located at a statistically selected metering site 112, the audio signal portion of the received program signal is processed to recover the code, even though the presence of that code is imperceptible (or substantially imperceptible) to a listener when the encoded audio signal is presented by speakers 114 of the receiver 110. To this end, a decoder 116 is connected either directly to an audio output 118 available at the receiver 110 or to a microphone 120 placed in the vicinity of the speakers 114 through which the audio is reproduced. The received audio signal can be either in a monaural or stereo format. Further details regarding decoding and example decoders are provided below.

Audio Encoding

Figure 2:
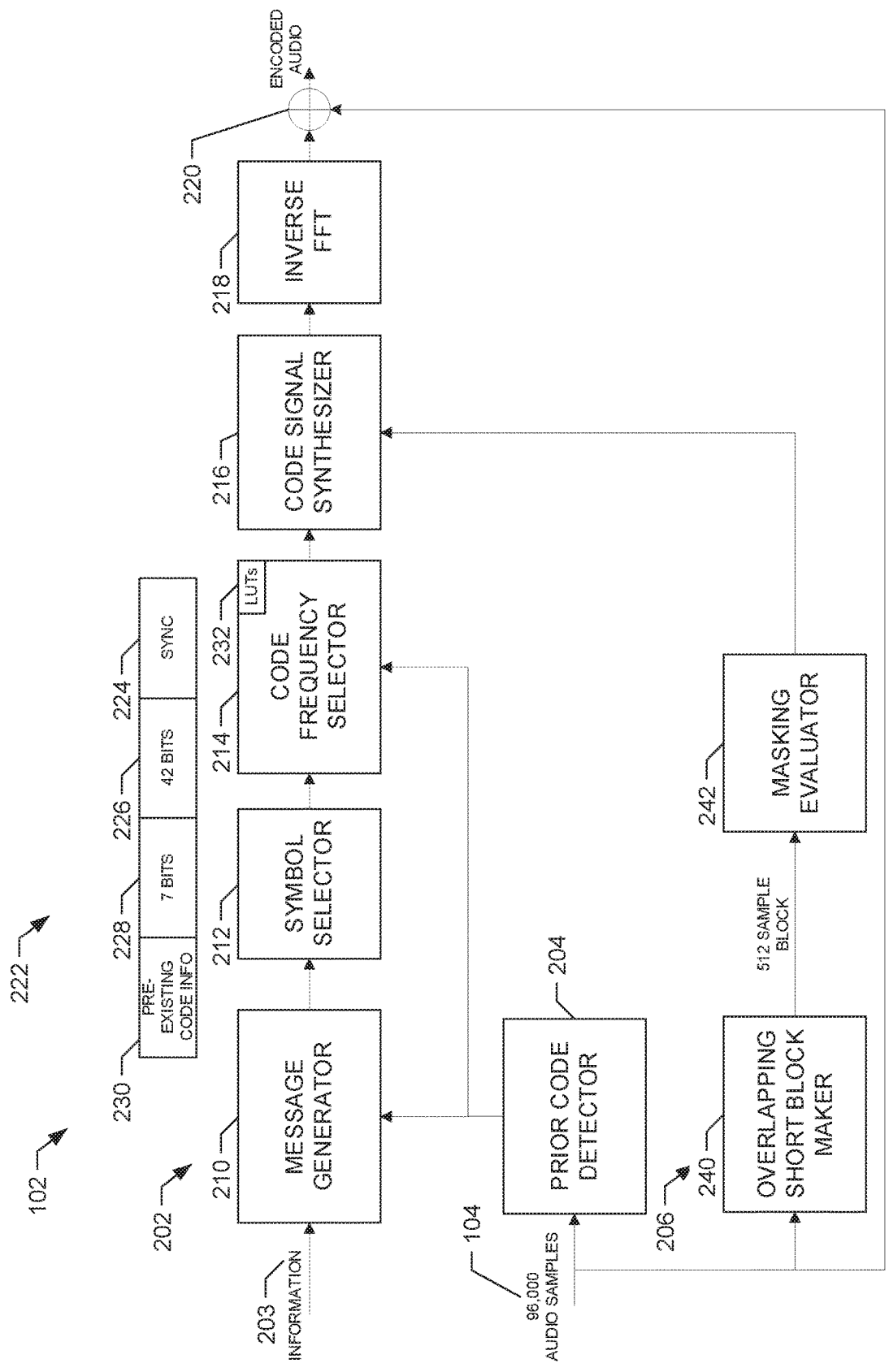
FIG. 2 is a block diagram of an example encoder of FIG. 1.

As explained above, the encoder 102 inserts one or more inaudible (or substantially inaudible) codes into the audio 104 to create encoded audio. One example encoder 102 is shown in FIG. 2. In one implementation, the example encoder 102 of FIG. 2 may be implemented using, for example, a digital signal processor programmed with instructions to implement an encoding lineup 202, the operation of which is affected by the operations of a prior code detector 204 and a masking lineup 206, either or both of which can be implemented using a digital signal processor programmed with instructions. Of course, any other implementation of the example encoder 102 is possible. For example, the encoder 102 may be implemented using one or more processors, programmable logic devices, or any suitable combination of hardware, software, and firmware.

In general, during operation, the encoder 102 receives the audio 104 and the prior code detector 204 determines if the audio 104 has been previously encoded with information, which will make it difficult for the encoder 102 to encode additional information into the previously encoded audio. For example, a prior encoding may have been performed at a prior location in the audio distribution chain (e.g., at a national network level). The prior code detector 204 informs the encoding lineup 202 as to whether the audio has been previously encoded. The prior code detector 204 may be implemented by a decoder as described herein.

The encoding lineup 202 receives the information 103 and produces code frequency signals based thereon and combines the code frequency signal with the audio 104. The operation of the encoding lineup 202 is influenced by the output of the prior code detector 204. For example, if the audio 104 has been previously encoded and the prior code detector 204 informs the encoding lineup 202 of this fact, the encoding lineup 202 may select an alternate message that is to be encoded in the audio 104 and may also alter the details by which the alternate message is encoded (e.g., different temporal location within the message, different frequencies used to represent symbols, etc.).

The encoding lineup 202 is also influenced by the masking lineup 206. In general, the masking lineup 206 processes the audio 104 corresponding to the point in time at which the encoding lineup 202 wants to encode information and determines the amplitude at which the encoding should be performed. As described below, the masking lineup 206 may output a signal to control code frequency signal amplitudes to keep the code frequency signal below the threshold of human perception.

As shown in the example of FIG. 2, the encoding lineup includes a message generator 210, a symbol selector 212, a code frequency selector 214, a synthesizer 216, an inverse Fourier transform 218, and a combiner 220. The message generator 210 is responsive to the information 103 and outputs messages having the format generally shown at reference numeral 222. The information 103 provided to the message generator may be the current time, a television or radio station identification, a program identification, etc. In one example, the message generator 210 may output a message every two seconds. Of course, other messaging intervals are possible.

In one example, the message format 222 representative of messages output from the message generator 210 includes a synchronization symbol 224. The synchronization symbol 224 is used by decoders, examples of which are described below, to obtain timing information indicative of the start of a message. Thus, when a decoder receives the synchronization symbol 224, that decoder expects to see additional information following the synchronization symbol 224.

In the example message format 222 of FIG. 2, the synchronization symbol 224, is followed by 42 bits of message information 226. This information may include a binary representation of a station identifier and coarse timing information. In one example, the timing information represented in the 42 bits of message information 226 changes every 64 seconds, or 32 message intervals. Thus, the 42 bits of message information 226 remain static for 64 seconds. The seven bits of message information 228 may be high resolution time that increments every two seconds.

The message format 222 also includes pre-existing code flag information 230. However, the pre-existing code flag information 230 is only selectively used to convey information. When the prior code detector 204 informs the message generator 210 that the audio 104 has not been previously encoded, the pre-existing code flag information 230 is not used. Accordingly, the message output by the message generator only includes the synchronization symbol 224, the 42 bits of message information 226, and the seven bits of message information 228; the pre-existing code flag information 230 is blank or filled by unused symbol indications. In contrast, when the prior code detector 204 provides to the message generator 210 an indication that the audio 104 into which the message information is to be encoded has previously been encoded, the message generator 210 will not output the synchronization symbol 224, the 42 bits of message information 226, or the seven bits of message information 228. Rather, the message generator 210 will utilize only the pre-existing code flag information 230. In one example, the pre-existing code flag information will include a pre-existing code flag synchronization symbol to signal that pre-existing code flag information is present. The pre-existing code flag synchronization symbol is different from the synchronization symbol 224 and, therefore, can be used to signal the start of pre-existing code flag information. Upon receipt of the pre-existing code flag synchronization symbol, a decoder can ignore any prior-received information that aligned in time with a synchronization symbol 224, 42 bits of message information 226, or seven bits of message information 228. To convey information, such as a channel indication, a distribution identification, or any other suitable information, a single pre-existing code flag information symbol follows the pre-existing code flag synchronization symbol. This pre-existing code flag information may be used to provide for proper crediting in an audience monitoring system.

The output from the message generator 210 is passed to the symbol selector 212, which selects representative symbols. When the synchronization symbol 224 is output, the symbol selector may not need to perform any mapping because the synchronization symbol 224 is already in symbol format. Alternatively, if bits of information are output from the message generator 210, the symbol selector may use straight mapping, wherein, for example seven bits output from the message generator 210 are mapped to a symbol having the decimal value of the seven bits. For example, if a value of 1010101 is output from the message generator 210, the symbol selector may map those bits to the symbol 85. Of course other conversions between bits and symbols may be used. In certain examples, redundancy or error encoding may be used in the selection of symbols to represent bits. Additionally, any other suitable number of bits than seven may be selected to be converted into symbols. The number of bits used to select the symbol may be determined based on the maximum symbol space available in the communication system. For example, if the communication system can only transmit one of four symbols at a time, then only two bits from the message generator 210 would be converted into symbols at a time.

Figure 7:
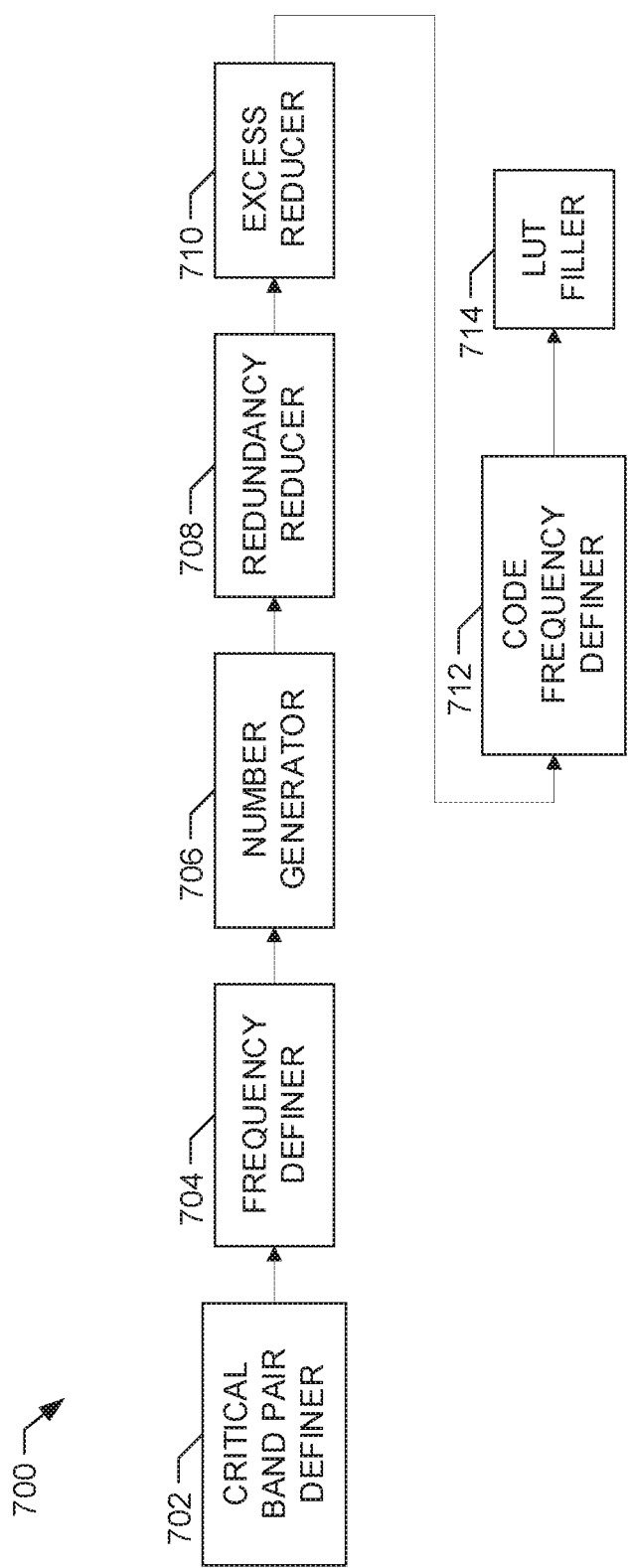

The symbols from the symbol selector 212 are passed to the code frequency selector 214 that selects code frequencies that are used to represent the symbol. The symbol selector 212 may include one or more look up tables (LUTs) 232 that may be used to map the symbols into code frequencies that represent the symbols. That is, a symbol is represented by a plurality of code frequencies that the encoder 102 emphasizes in the audio to form encoded audio that is transmitted. Upon receipt of the encoded audio, a decoder detects the presence of the emphasized code frequencies and decodes the pattern of emphasized code frequencies into the transmitted symbol. Thus, the same LUT selected at the encoder 210 for selecting the code frequencies needs to be used in the decoder. One example LUT is described in conjunction with FIGS. 3-5. Additionally, example techniques for generating LUTs are provided in conjunction with FIGS. 7-9.

The code frequency selector 214 may select any number of different LUTs depending of various criteria. For example, a particular LUT or set of LUTs may be used by the code frequency selector 214 in response to the prior receipt of a particular synchronization symbol. Additionally, if the prior code detector 204 indicates that a message was previously encoded into the audio 104, the code frequency selector 214 may select a lookup table that is unique to pre-existing code situations to avoid confusion between frequencies used to previously encode the audio 104 and the frequencies used to include the pre-existing code flag information.

An indication of the code frequencies that are selected to represent a particular symbol is provided to the synthesizer 216. The synthesizer 216 may store, for each short block constituting a long block, three complex Fourier coefficients representative of each of the possible code frequencies that the code frequency selector 214 will indicate. These coefficients represent the transform of a windowed sinusoidal code frequency signal whose phase angle corresponds to the starting phase angle of code sinusoid in that short block.

While the foregoing describes an example code synthesizer 208 that generates sine waves or data representing sine waves, other example implementations of code synthesizers are possible. For example, rather than generating sine waves, another example code synthesizer 208 may output Fourier coefficients in the frequency domain that are used to adjust amplitudes of certain frequencies of audio provided to the combiner combiner 220. In this manner, the spectrum of the audio may be adjusted to include the requisite sine waves.

The three complex amplitude-adjusted Fourier coefficients corresponding to the symbol to be transmitted are provided from the synthesizer 216 to the inverse Fourier transform 218, which converts the coefficients into time-domain signals having the prescribed frequencies and amplitudes to allow their insertion into the audio to convey the desired symbols are coupled to the combiner 220. The combiner 220 also receives the audio. In particular, the combiner 220 inserts the signals from the inverse Fourier transform 218 into one long block of audio samples. As described above, for a given sampling rate of 48 KHz, a long block is 9216 audio samples. In the provided example, the synchronization symbol and 49 bits of information require a total of eight long blocks. Because each long block is 9216 audio samples, only 73,728 samples of audio 104 are needed to encode a given message. However, because messages begin every two seconds, which is every 96,000 audio samples, there will be many samples at the end of the 96,000 audio samples that are not encoded. The combining can be done in the digital domain, or in the analog domain.

However, in the case of a pre-existing code flag, the pre-existing code flag is inserted into the audio 104 after the last symbol representing the previously inserted seven bits of message information. Accordingly, insertion of the pre-existing code flag information begins at sample 73,729 and runs for two long blocks, or 18,432 samples. Accordingly, when pre-existing code flag information is used, fewer of the 96,000 audio samples 104 will be unencoded.

The masking lineup 206 includes an overlapping short block maker that makes short blocks of 512 audio samples, wherein 256 of the samples are old and 256 samples are new. That is, the overlapping short block maker 240 makes blocks of 512 samples, wherein 256 samples are shifted into or out of the buffer at one time. For example, when a first set of 256 samples enters the buffer, the oldest 256 samples are shifted out of the buffer. On a subsequent iteration, the first set of 256 samples are shifted to a latter position of the buffer and 256 samples are shifted into the buffer. Each time a new short block is made by shifting in 256 new samples and removing the 256 oldest samples, the new short block is provided to a masking evaluator 242. The 512 sample block output from the overlapping short block maker 240 is multiplied by a suitable window function such that an "overlap-and-add" operation will restore the audio samples to their correct value at the output. A synthesized code signal to be added to an audio signal is also similarly windowed to prevent abrupt transitions at block edges when there is a change in code amplitude from one 512-sample block to the next overlapped 512-sample block. These transitions if present create audible artifacts.

The masking evaluator 242 receives samples of the overlapping short block (e.g., 512 samples) and determines an ability of the same to hide code frequencies to human hearing. That is, the masking evaluator determines if code frequencies can be hidden within the audio represented by the short block by evaluating each critical band of the audio as a whole to determine its energy and determining the noise-like or tonal-like attributes of each critical band and determining the sum total ability of the critical bands to mask the code frequencies. According to the illustrated example, the bandwidth of the critical bands increases with frequency. If the masking evaluator 242 determines that code frequencies can be hidden in the audio 104, the masking evaluator 204 indicates the amplitude levels at which the code frequencies can be inserted within the audio 104, while still remaining hidden and provides the amplitude information to the synthesizer 216.

In one example, the masking evaluator 242 conducts the masking evaluation by determining a maximum change in energy $E_b$ or a masking energy level that can occur at any critical frequency band without making the change perceptible to a listener. The masking evaluation carried out by the masking evaluator 242 may be carried out as outlined in the Moving Pictures Experts Group—Advanced Audio Encoding (MPEG-AAC) audio compression standard ISO/IEC 13818-7:1997, for example. The acoustic energy in each critical band influences the masking energy of its neighbors and algorithms for computing the masking effect are described in the standards document such as ISO/IEC 13818-7:1997. These analyses may be used to determine for each short block the masking contribution due to tonality (e.g., how much the audio being evaluated is like a tone) as well as noise like (i.e., how much the audio being evaluated is like noise) features. Further analysis can evaluate temporal masking that extends masking ability of the audio over short time, typically, for 50-100 milliseconds (ms). The resulting analysis by the masking evaluator 242 provides a determination, on a per critical band basis, the amplitude of a code frequency that can be added to the audio 104 without producing any noticeable audio degradation (e.g., without being audible).

Because a 256 sample block will appear in both the beginning of one short block and the end of the next short block and, thus, will be evaluated two times by the masking evaluator 242, the masking evaluator makes two masking evaluations including the 256 sample block. The amplitude indication provided to the synthesizer 216 is a composite of those two evaluations including that 256 sample block and the amplitude indication is timed such that the amplitude of the code inserted into the 256 samples is timed with those samples arriving at the combiner 220.

Referring now to FIGS. 3-5, an example LUT 232 is shown that includes one column representing symbols 302 and seven columns 304, 306, 308, 310, 312, 314, 316 representing numbered code frequency indices. The LUT 232 includes 129 rows, 128 of which are used to represent data symbols and one of which is used to represent a synchronization symbol. Because the LUT 232 includes 128 different data symbols, data may be sent at a rate of seven bits per symbol. The frequency indices in the table may range from 180-656 and are based on a long block size of 9216 samples and a sampling rate of 48 KHz. Accordingly, the frequencies corresponding to these indices range between 937.5 Hz and 3126.6 Hz, which falls into the humanly audible range. Of course, other sampling rates and frequency indices may be selected. A description of a process to generate a LUT, such as the table 232 is provided in conjunction with FIGS. 7-9.

In one example operation of the code frequency selector 214, a symbol of 25 (e.g., a binary value of 0011001) is received from the symbol selector 212. The code frequency selector 214 accesses the LUT 232 and reads row 25 of the symbol column 302. From this row, the code frequency selector reads that code frequency indices 217, 288, 325, 403, 512, 548, and 655 are to be emphasized in the audio 104 to communicate the symbol 25 to the decoder. The code frequency selector 214 then provides an indication of these indices to the synthesizer 216, which synthesizes the code signals by outputting Fourier coefficients corresponding to these indices.

The combiner 220 receives both the output of the code synthesizer 208 and the audio 104 and combines them to form encoded audio. The combiner 220 may combine the output of the code synthesizer 208 and the audio 104 in an analog or digital form. If the combiner 220 performs a digital combination, the output of the code synthesizer 208 may be combined with the output of the sampler 202, rather than the audio 104 that is input to the sampler 202. For example, the audio block in digital form may be combined with the sine waves in digital form. Alternatively, the combination may be carried out in the frequency domain, wherein frequency coefficients of the audio are adjusted in accordance with frequency coefficients representing the sine waves. As a further alternative, the sine waves and the audio may be combined in analog form. The encoded audio may be output from the combiner 220 in analog or digital form. If the output of the combiner 220 is digital, it may be subsequently converted to analog form before being coupled to the transmitter 106.

Figure 6:
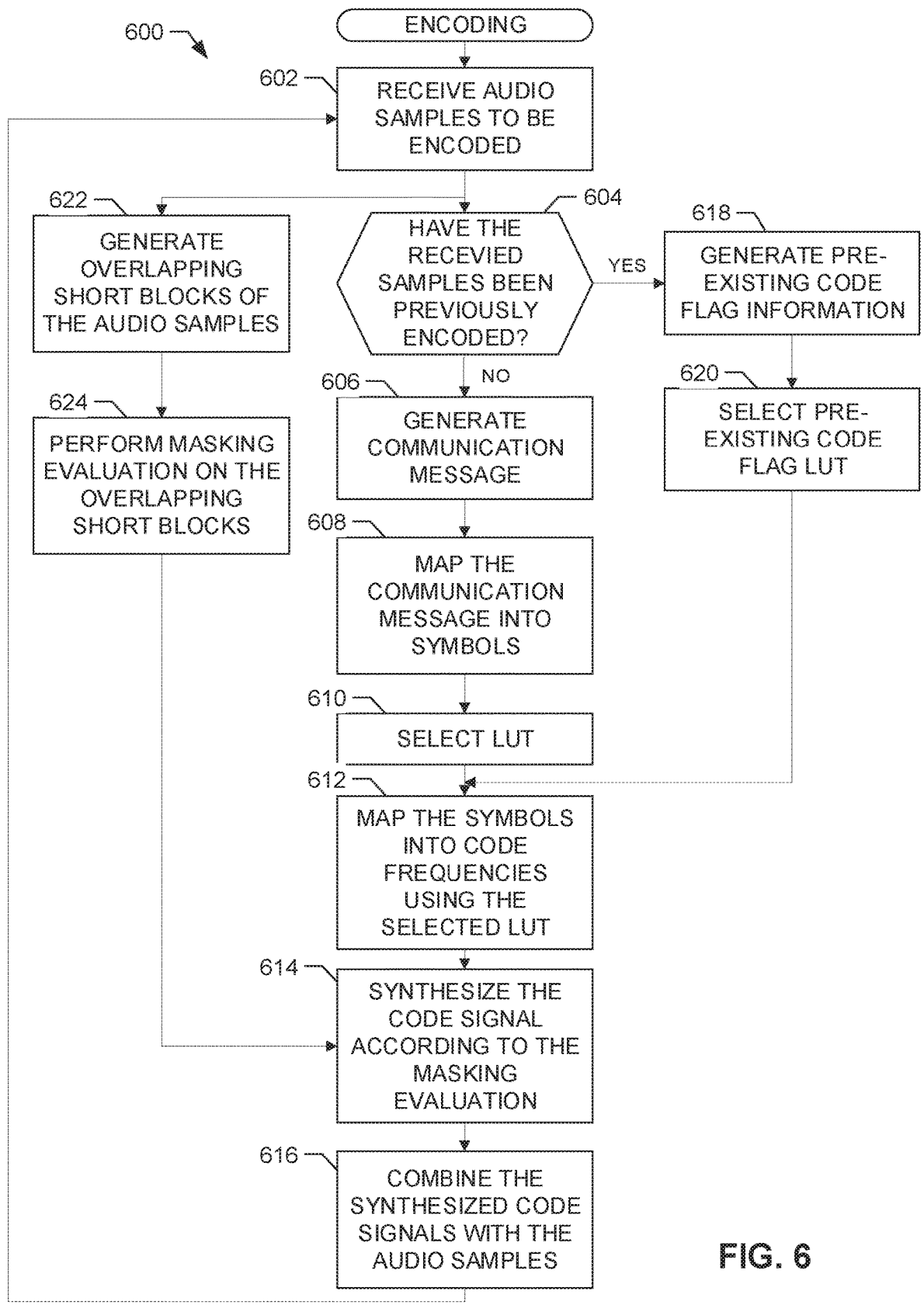
FIG. 6 illustrates one example of selecting frequency components that will represent a particular information symbol.

An example encoding process 600 is shown in FIG. 6. The example process 600 may be carried out by the example encoder 102 of FIG. 2, or by any other suitable encoder. The example process 600 begins when audio samples to be encoded are received (block 602). The process 600 then determines if the received samples have been previously encoded (block 604). This determination may be carried out, for example, by the prior code detector 204 of FIG. 2, or by any suitable decoder configured to examine the audio to be encoded for evidence of a prior encoding.

If the received samples have not been previously encoded (block 604), the process 600 generates a communication message (block 606), such as a communication message having the format shown in FIG. 2 at reference numeral 222. In one particular example, when the audio has not been previously encoded, the communication message may include a synchronization portion and one or more portions including data bits. The communication message generation may be carried out, for example, by the message generator 210 of FIG. 2.

The communication message is then mapped into symbols (block 608). For example, the synchronization information need not be mapped into a symbol if the synchronization information is already a symbol. In another example, if a portion of the communication message is a series of bits, such bits or groups of bits may be represented by one symbol. As described above in conjunction with the symbol selector 212, which is one manner in which the mapping (block 608) may be carried out, one or more tables or encoding schemes may be used to convert bits into symbols. For example, some techniques may include the use of error correction coding, or the like, to increase message robustness through the use of coding gain. In one particular example implementation having a symbol space sized to accommodate 128 data symbols, seven bits may be converted into one symbol. Of course, other numbers of bits may be processed depending on many factors including available symbol space, error correction encoding, etc.

After the communication symbols have been selected (block 608), the process 600 selects a LUT that will be used to determine the code frequencies that will be used to represent each symbol (block 610). In one example, the selected LUT may be the example LUT 232 of FIGS. 3-5, or may be any other suitable LUT. Additionally, the LUT may be any LUT generated as described in conjunction with FIGS. 7-9. The selection of the LUT may be based on a number of factors including the synchronization symbol that is selected during the generation of the communication message (block 606).

After the symbols have been generated (block 608) and the LUT is selected (block 610), the symbols are mapped into code frequencies using the selected LUT (block 612). In one example in which the LUT 232 of FIG. 3-5 is selected, a symbol of, for example, 35 would be mapped to the frequency indices 218, 245, 360, 438, 476, 541, and 651. The data space in the LUT is between symbol 0 and symbol 127 and symbol 128, which uses a unique set of code frequencies that do not match any other code frequencies in the table, is used to indicate a synchronization symbol. The LUT selection (block 610) and the mapping (block 612) may be carried out by, for example, the code frequency selector 214 of FIG. 2. After the code frequencies are selected, an indication of the same is provided to, for example, the synthesizer 216 of FIG. 2.

Code signals including the code frequencies are then synthesized (block 614) at amplitudes according to a masking evaluation, which is described in conjunction with blocks 240 and 242 or FIG. 2, and is described in conjunction with the process 600 below. In one example, the synthesis of the code frequency signals may be carried out by providing appropriately scaled Fourier coefficients to an inverse Fourier process. In one particular example, three Fourier coefficients may be output to represent each code frequency in the code frequency signals. Accordingly, the code frequencies may be synthesized by the inverse Fourier process in a manner in which the synthesized frequencies are windowed to prevent spill over into other portions of the signal into which the code frequency signals are being embedded. One example configuration that may be used to carry out the synthesis of block 614 is shown at blocks 216 and 218 of FIG. 2. Of course other implementations and configurations are possible.

After the code signals including the code frequencies have been synthesized, they are combined with the audio samples (block 616). As described in conjunction with FIG. 2, the combination of the code signals and the audio is such that one symbol is inserted into each long block of audio samples. Accordingly, to communicate one synchronization symbol and 49 data bits, information is encoded into eight long blocks of audio information: one long block for the synchronization symbol and one long block for each seven bits of data (assuming seven bits/symbol encoding). The messages are inserted into the audio at two second intervals. Thus, the eight long blocks of audio immediately following the start of a message may be encoded with audio and the remaining long blocks that make up the balance of the two second of audio may be unencoded.

The insertion of the code signal into the audio may be carried out by adding samples of the code signal to samples of the host audio signal, wherein such addition is done in the analog domain or in the digital domain. Alternatively, with proper frequency alignment and registration, frequency components of the audio signal may be adjusted in the frequency domain and the adjusted spectrum converted back into the time domain.

The foregoing described the operation of the process 600 when the process determined that the received audio samples have not been previously encoded (block 604). However, in situations in which a portion of media has been through a distribution chain and encoded as it was processed, the received samples of audio processed at block 604 already include codes. For example, a local television station using a courtesy news clip from CNN in a local news broadcast might not get viewing credit based on the prior encoding of the CNN clip. As such, additional information is added to the local news broadcast in the form of pre-existing code flag information. If the received samples of audio have been previously encoded (block 604), the process generates pre-existing code flag information (block 618). The pre-existing code flag information may include the generation of an pre-existing code flag synchronization symbol and, for example, the generation of seven bits of data, which will be represented by a single data symbol. The data symbol may represent a station identification, a time, or any other suitable information. For example, a media monitoring site (MMS) may be programmed to detect the pre-existing code flag information to credit the station identified therein.

After the pre-existing code flag information has been generated (block 618), the process 600 selects the pre-existing code flag LUT that will be used to identify code frequencies representative of the pre-existing code flag information (block 620). In one example, the pre-existing code flag LUT may be different than other LUTs used in non-pre-existing code conditions. In one particular example, the pre-existing code flag synchronization symbol may be represented by the code frequencies 220, 292, 364, 436, 508, 580, and 652.

After the pre-existing code flag information is generated (block 618) and the pre-existing code flag LUT is selected (block 620), the pre-existing code flag symbols are mapped to code frequencies (block 612), and the remainder of the processing follows as previously described.

Sometime before the code signal is synthesized (block 614), the process 600 conducts a masking evaluation to determine the amplitude at which the code signal should be generated so that it still remains inaudible or substantially inaudible to human hearers. Accordingly, the process 600 generates overlapping short blocks of audio samples, each containing 512 audio samples (block 622). As described above, the overlapping short blocks include 50% old samples and 50% newly received samples. This operation may be carried out by, for example, the overlapping short block maker 240 of FIG. 2.

After the overlapping short blocks are generated (block 622), masking evaluations are performed on the short blocks (block 624). For example, this may be carried out as described in conjunction with block 242 of FIG. 2. The results of the masking evaluation are used by the process 600 at block 614 to determine the amplitude of the code signal to be synthesized. The overlapping short block methodology may yield two masking evaluation for a particular 256 samples of audio (one when the 256 samples are the "new samples," and one when the 256 samples are the "old samples"), the result provided to block 614 of the process 600 may be a composite of these masking evaluations. Of course, the timing of the process 600 is such that the masking evaluations for a particular block of audio are used to determine code amplitudes for that block of audio.

Lookup Table Generation

A system 700 for populating one or more LUTs with code frequencies corresponding to symbols may be implemented using hardware, software, combinations of hardware and software, firmware, or the like. The system 700 of FIG. 7 may be used to generate any number of LUTs, such as the LUT of FIGS. 3-5. The system 700 which operates as described below in conjunction with FIG. 7 and FIG. 8, results in a code frequency index LUT, wherein: (1) two symbols of the table are represented by no more than one common frequency index, (2) not more than one of the frequency indices representing a symbol reside in one audio critical band as defined by the MPEG-AA compression standard ISO/IEC 13818-7:1997, and (3) code frequencies of neighboring critical bands are not used to represent a single symbol. Criteria number 3 helps to ensure that audio quality is not compromised during the audio encoding process.

Figure 10:
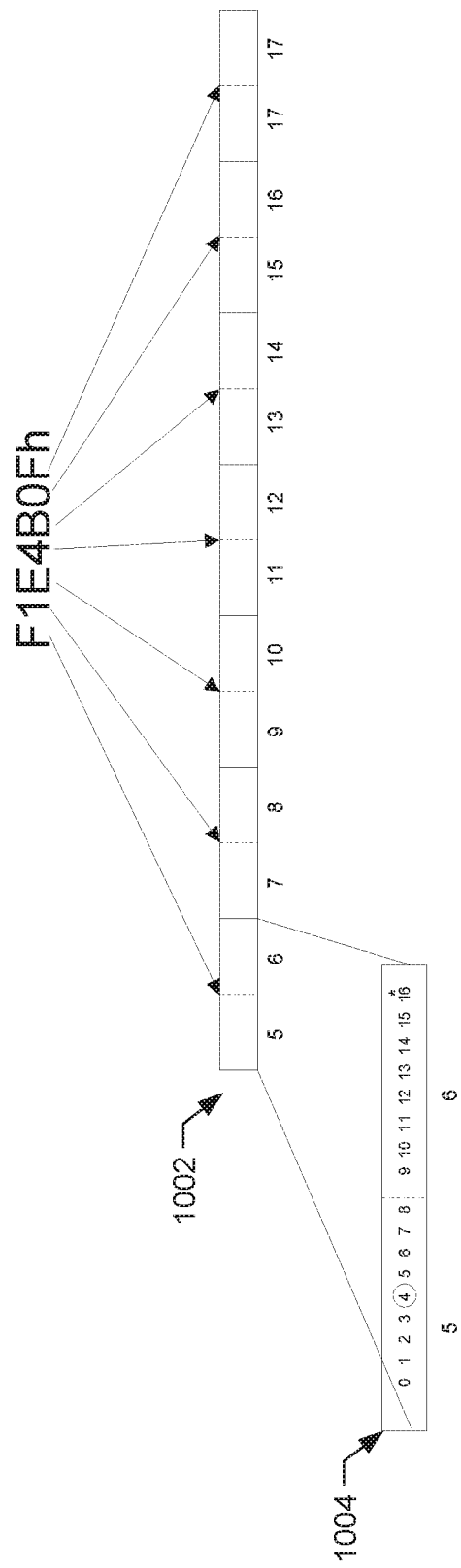
FIG. 10 illustrates the frequency relationship between the audio encoding indices.

A critical band pair definer 702 defines a number (P) of critical band pairs. For example, referring to FIG. 9, a table 900 includes columns representing AAC critical band indices 902, short block indices 904 in the range of the AAC indices, and long block indices 906 in the range of the AAC indices. In one example, the value of P may be seven and, thus, seven critical band pairs are formed from the AAC indices (block 802). FIG. 10 shows the frequency relationship between the AAC indices. According to one example, as shown at reference numeral 1002 in FIG. 10 wherein frequencies of critical band pairs are shown as separated by dotted lines, AAC indices may be selected into pairs as follows: five and six, seven and eight, nine and ten, eleven and twelve, thirteen and fourteen, fifteen and sixteen, and seventeen and seventeen. The AAC index of seventeen includes a wide range of frequencies and, therefore, index 17 is shown twice, once for the low portion and once for the high portion.

A frequency definer 704 defines a number of frequencies (N) that are selected for use in each critical band pair. In one example, the value of N is sixteen, meaning that there are sixteen data positions in the combination of the critical bands that form each critical band pair. Reference numeral 1004 in FIG. 10 identifies the seventeen frequency positions are shown. The circled position four is reserved for synchronization information and, therefore, is not used for data.

A number generator 706 defines a number of frequency positions in the critical band pairs defined by the critical band pair definer 702. In one example the number generator 706 generates all $N^P$, P-digit numbers. For example, if N is 16 and P is 7, the process generates the numbers 0 through 268435456, but may do so in base 16-hexadecimal, which would result in the values 0 through 10000000.

A redundancy reducer 708 then eliminates all number from the generated list of numbers sharing more than one common digit between them in the same position. This ensures compliance with criteria (1) above because, as described below, the digits will be representative of the frequencies selected to represent symbols. An excess reducer 710 may then further reduce the remaining numbers from the generated list of numbers to the number of needed symbols. For example, if the symbol space is 129 symbols, the remaining numbers are reduced to a count of 129. The reduction may be carried out at random, or by selecting remaining numbers with the greatest Euclidean distance, or my any other suitable data reduction technique. In another example, the reduction may be carried out in a pseudorandom manner.

After the foregoing reductions, the count of the list of numbers is equal to the number of symbols in the symbol space. Accordingly, a code frequency definer 712 defines the remaining numbers in base P format to represent frequency indices representative of symbols in the critical band pairs. For example, referring to FIG. 10, the hexadecimal number F1E4B0F is in base 16, which matches P. The first digit of the hexadecimal number maps to a frequency component in the first critical band pair, the second digit to the second critical band pair, and so on. Each digit represents the frequency index that will be used to represent the symbol corresponding to the hexadecimal number F1E4B0F.

Using the first hexadecimal number as an example of mapping to a particular frequency index, the decimal value of Fh is 15. Because position four of each critical band pair is reserved for non-data information, the value of any hexadecimal digit greater than four is incremented by the value of one decimal. Thus, the 15 becomes a 16. The 16 is thus designated (as shown with the asterisk in FIG. 10) as being the code frequency component in the first critical band pair to represent the symbol corresponding to the hexadecimal number F1E4B0F. Though not shown in FIG. 10, the index 1 position (e.g., the second position from the far left in the critical band 7 would be used to represent the hexadecimal number F1E4B0F.

A LUT filler 714 receives the symbol indications and corresponding code frequency component indications from the code frequency definer 712 and fills this information into a LUT.

Figure 8:
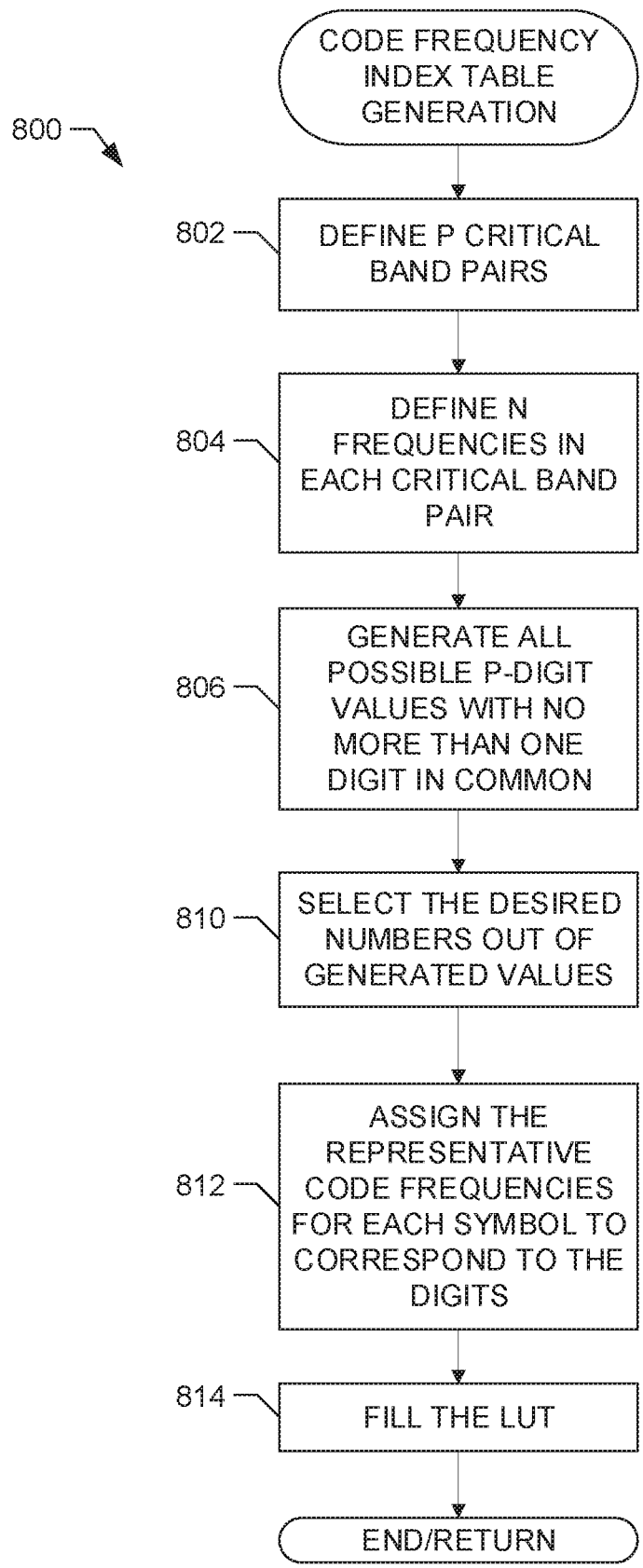

An example code frequency index table generation process 800 is shown in FIG. 8. The process 800 may be implemented using the system of FIG. 7, or any other suitable configuration. The process 800 of FIG. 8 may be used to generate any number of LUTs, such as the LUT of FIGS. 3-5. While one example process 800 is shown, other processes may be used. The result of the process 800 is a code frequency index LUT, wherein: (1) two symbols of the table are represented by no more than one common frequency index, (2) not more than one of the frequency indices representing a symbol reside in one audio critical band as defined by the MPEG-AA compression standard ISO/IEC 13818-7:1997, and (3) code frequencies of neighboring critical bands are not used to represent a single symbol. Criteria number 3 helps to ensure that audio quality is not compromised during the audio encoding process.

The process 800 begins by defining a number (P) of critical band pairs. For example, referring to FIG. 9, a table 900 includes columns representing AAC critical band indices 902, short block indices 904 in the range of the AAC indices, and long block indices 906 in the range of the AAC indices. In one example, the value of P may be seven and, thus, seven critical band pairs are formed from the AAC indices (block 802). FIG. 10 shows the frequency relationship between the AAC indices. According to one example, as shown at reference numeral 1002 in FIG. 10 wherein frequencies of critical band pairs are shown as separated by dotted lines, AAC indices may be selected into pairs as follows: five and six, seven and eight, nine and ten, eleven and twelve, thirteen and fourteen, fifteen and sixteen, and seventeen and seventeen. The AAC index of seventeen includes a wide range of frequencies and, therefore, index 17 is shown twice, once for the low portion and once for the high portion.

After the band pairs have been defined (block 802), a number of frequencies (N) is selected for use in each critical band pair (block 804). In one example, the value of N is sixteen, meaning that there are sixteen data positions in the combination of the critical bands that form each critical band pair. As shown in FIG. 10 as reference numeral 1004, seventeen frequency positions are shown. The circled position four is reserved for synchronization information and, therefore, is not used for data.

After the number of critical band pairs and the number of frequency positions in the pairs is defined, the process 800 generates all $N^P$, P-digit numbers with no more than one hexadecimal digit in common (block 806). For example, if N is 16 and P is 7, the process generates the numbers 0 through 268435456, but may do so in base 16-hexadecimal, which would results in 0 through FFFFFFF, but does not include the numbers that share more than one common hexadecimal digit. This ensures compliance with criteria (1) above because, as described below, the digits will be representative of the frequencies selected to represent symbols.

According to an example process for determining a set of numbers that comply with criteria (1) above (and any other desired criteria), the numbers in the range from 0 to $N^P-1$ are tested. First, the value corresponding to zero is stored as the first member of the result set R. Then, the numbers from 1 to $N^P-1$ are selected for analysis to determine if they meet criteria (1) when compared to the members of R. Each number that meets criteria (1) when compared against all the current entries in R is added to the result set. In particular, according to the example process, in order to test a number K, each hexadecimal digit of interest in K is compared to the corresponding hexadecimal digit of interest in an entry M from the current result set. In the 7 comparisons not more than one hexadecimal digit of K should equal the corresponding hexadecimal digit of M. If, after comparing K against all numbers currently in the result set, no member of the latter has more than one common hexadecimal digit, then K is added to the result set R. The algorithm iterates through the set of possible numbers until all values meeting criteria (1) have been identified.

While the foregoing describes an example process for determining a set of numbers that meets criteria (1), any process or algorithm may be used and this disclosure is not limited to the process described above. For example, a process may use heuristics, rules, etc. to eliminate numbers from the set of numbers before iterating throughout the set. For example, all of the numbers where the relevant bits start with two 0's, two 1's, two 2's, etc. and end with two 0's, two 1's, two 2's, etc. could immediately be removed because they will definitely have a hamming distance less than 6. Additionally or alternatively, an example process may not iterate through the entire set of possible numbers. For example, a process could iterate until enough numbers are found (e.g., 128 numbers when 128 symbols are desired). In another implementation, the process may randomly select a first value for inclusion in the set of possible values and then may search iteratively or randomly through the remaining set of numbers until a value that meets the desired criteria (e.g., criteria (1)) is found.

The process 800 then selects the desired numbers from the generated values (block 810). For example, if the symbol space is 129 symbols, the remaining numbers are reduced to a count of 129. The reduction may be carried out at random, or by selecting remaining numbers with the greatest Euclidean distance, or my any other suitable data reduction technique.

After the foregoing reductions, the count of the list of numbers is equal to the number of symbols in the symbol space. Accordingly, the remaining numbers in base P format are defined to represent frequency indices representative of symbols in the critical band pairs (block 812). For example, referring to FIG. 10, the hexadecimal number F1E4B0F is in base 16, which matches P. The first digit of the hexadecimal number maps to a frequency component in the first critical band pair, the second digit to the second critical band pair, and so on. Each digit represents the frequency index that will be used to represent the symbol corresponding to the hexadecimal number F1E4B0F.

Using the first hexadecimal number as an example of mapping to a particular frequency index, the decimal value of Fh is 15. Because position four of each critical band pair is reserved for non-data information, the value of any hexadecimal digit greater than four is incremented by the value of one decimal. Thus, the 15 becomes a 16. The 16 is thus designated (as shown with the asterisk in FIG. 10) as being the code frequency component in the first critical band pair to represent the symbol corresponding to the hexadecimal number F1E4B0F. Though not shown in FIG. 10, the index 1 position (e.g., the second position from the far left in the critical band 7 would be used to represent the hexadecimal number F1E4B0F.

After assigning the representative code frequencies (block 812), the numbers are filled into a LUT (block 814).

Of course, the systems and processes described in conjunction with FIGS. 8-10 are only examples that may be used to generate LUTs having desired properties in conjunction the encoding and decoding systems described herein. Other configurations and processes may be used.

Audio Decoding

In general, the decoder 116 detects a code signal that was inserted into received audio to form encoded audio at the encoder 102. That is, the decoder 116 looks for a pattern of emphasis in code frequencies it processes. Once the decoder 116 has determined which of the code frequencies have been emphasized, the decoder 116 determines, based on the emphasized code frequencies, the symbol present within the encoded audio. The decoder 116 may record the symbols, or may decode those symbols into the codes that were provided to the encoder 102 for insertion into the audio.

Figure 11:
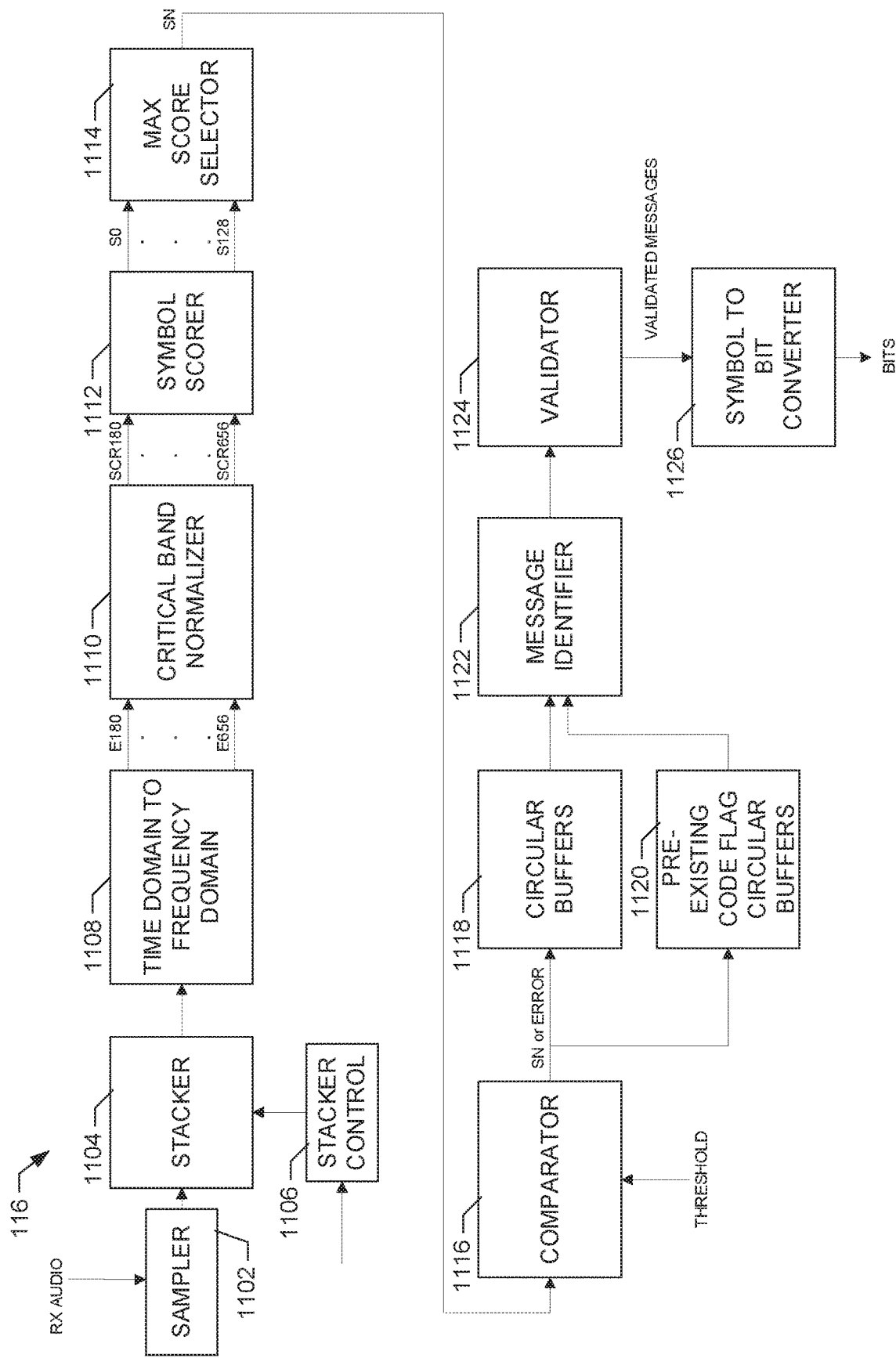
FIG. 11 is a block diagram of the example decoder of FIG. 1.

In one implementation, the example decoder 116 of FIG. 11 may be implemented using, for example, a digital signal processor programmed with instructions to implement components of the decoder 116. Of course, any other implementation of the example decoder 116 is possible. For example, the decoder 116 may be implemented using one or more processors, programmable logic devices, or any suitable combination of hardware, software, and firmware.

As shown in FIG. 11, an example decoder 116 includes a sampler 1102, which may be implemented using an analog to digital converter (A/D) or any other suitable technology, to which encoded audio is provided in analog format. As shown in FIG. 1, the encoded audio may be provided by a wired or wireless connection to the receiver 110. The sampler 1102 samples the encoded audio at, for example, a sampling frequency of 8 KHz. Of course, other sampling frequencies may be advantageously selected in order to increase resolution or reduce the computational load at the time of decoding. At a sampling frequency of 8 KHz, the Nyquist frequency is 4 KHz and, therefore, all of the embedded code signal is preserved because its spectral frequencies are lower than the Nyquist frequency. The 9216-sample FFT long block length at 48 KHz sampling rate is reduced to 1536 samples at 8 KHz sampling rate. However even at this modified DFT block size, the code frequency indices are identical to the original encoding frequencies and range from 180 to 656.

The samples from the sampler 1102 are provided to a stacker 1104. In general, the stacker 1104 accentuates the code signal in the audio signal information by taking advantage of the fact that messages are repeated or substantially repeated (e.g., only the least significant bits are changed) for a period of time. For example, 42 bits (226 of FIG. 2) of the 49 bits (226 and 224) of the previously described example message of FIG. 2 remain constant for 64 seconds (322-second message intervals) when the 42 bits of data 226 in the message include a station identifier and a coarse time stamp which increments once every 64 seconds. The variable data in the last 7 bit group 232 represents time increments in seconds and, thus, varies from message to message. The example stacker 1104 aggregates multiple blocks of audio signal information to accentuate the code signal in the audio signal information. In an example implementation, the stacker 1104 comprises a buffer to store multiple samples of audio information. For example, if a complete message is embedded in two seconds of audio, the buffer may be twelve seconds long to store six messages. The example stacker 1104 additionally comprises an adder to sum the audio signal information associated with the six messages and a divider to divide the sum by the number of repeated messages selected (e.g., six).

By way of example, a watermarked signal y(t) can be represented by the sum of the host signal x(t) and watermark w(t):

$$y(t)=x(t)+w(t)$$

In the time domain, watermarks may repeat after a known period T:

$$w(t)=w(t-T)$$

According to an example stacking method, the input signal y(t) is replaced by a stacked signal S(t):

$$S(t) = \frac{y(t) + y(t-T) + \ldots + y(t-(n-1)T)}{n}$$

In the stacked signal S(t), the contribution of the host signal decreases because the values of samples x(t), x(t−T), . . . , x(t−nT) are independent if the period T is sufficiently large. At the same time, the contribution of the watermarks being made of, for example, in-phase sinusoids, is enhanced.

$$S(t) = \frac{x(t) + x(t-T) + \ldots + x(t-(n-1)T)}{n} + w(t)$$

Assuming x(t), x(t−T), . . . , x(t−nT) are independent random variables drawn from the same distribution X with zero mean E[X]=0 we obtain:

$$\lim_{n \to \infty} E\left[\frac{x(t) + x(t-T) + \ldots + x(t-(n-1)T)}{n}\right] \to 0,$$

and $$Var\left[\frac{x(t) + x(t-T) + \ldots + x(t-(n-1)T)}{n}\right] = \frac{Var(X)}{n}$$

Accordingly, the underlying host signal contributions x(t), . . . , x(t−nT) will effectively be canceling each other while the watermark is unchanged allowing the watermark to be more easily detected.

In the illustrated example, the power of the resulting signal decreases linearly with the number of stacked signals n. Therefore, averaging over independent portions of the host signal can reduce the effects of interference. The watermark is not affected because it will always be added in-phase.

Figure 12:
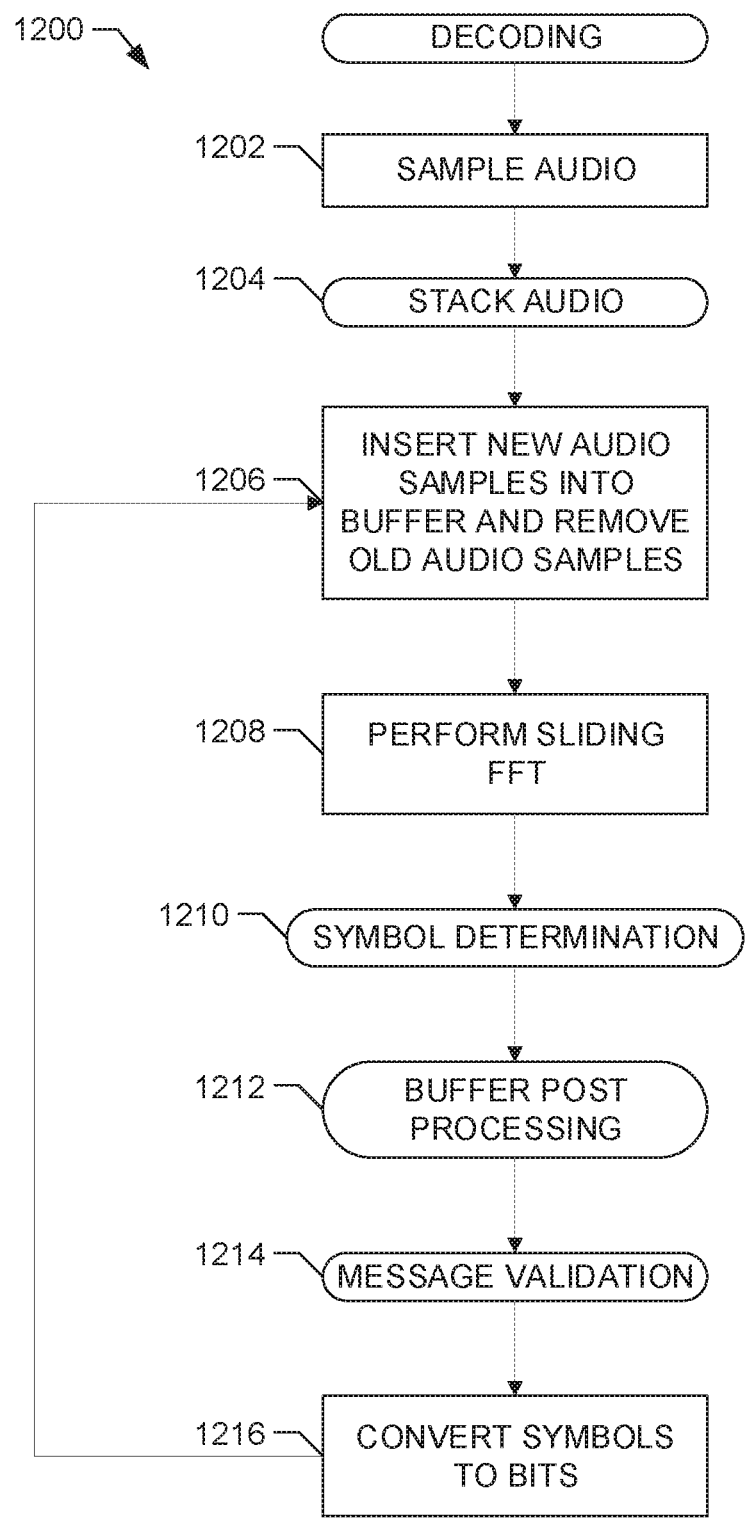
FIG. 12 is a flow diagram illustrating an example decoding process that may be carried out by the example encoder of FIG. 11.

An example process for implementing the stacker 1104 is described in conjunction with FIG. 12.

The decoder 116 may additionally include a stacker controller 1106 to control the operation of the stacker 1104. The example stacker controller 1106 receives a signal indicating whether the stacker 1104 should be enabled or disabled. For example, the stacker controller 1106 may receive the received audio signal and may determine if the signal includes significant noise that will distort the signal and, in response to the determination, cause the stacker to be enabled. In another implementation, the stacker controller 1106 may receive a signal from a switch that can be manually controlled to enable or disable the stacker 1104 based on the placement of the decoder 116. For example, when the decoder 116 is wired to the receiver 110 or the microphone 120 is placed in close proximity to the speaker 114, the stacker controller 1106 may disable the stacker 1104 because stacking will not be needed and will cause corruption of rapidly changing data in each message (e.g., the least significant bits of a timestamp). Alternatively, when the decoder 116 is located at a distance from the speaker 114 or in another environment where significant interference may be expected, the stacker 1104 may be enabled by the stacker controller 1106. Of course, any type of desired control may be applied by the stacker controller 1106.

The output of the stacker 1104 is provided to a time to frequency domain converter 1108. The time to frequency domain converter 1108 may be implemented using a discrete Fourier transformation (DFT), or any other suitable technique to convert time-based information into frequency-based information. In one example, the time to frequency domain converter 1108 may be implemented using a sliding long block fast Fourier transform (FFT) in which a spectrum of the code frequencies of interest is calculated each time eight new samples are provided to the example time to time to frequency domain converter 1108. In one example, the time to frequency domain converter 1108 uses 1,536 samples of the encoded audio and determines a spectrum therefrom using 192 slides of eight samples each. The resolution of the spectrum produced by the time to frequency domain converter 1108 increases as the number of samples used to generate the spectrum is increased. Thus, the number of samples processed by the time to frequency domain converter 1108 should match the resolution used to select the indices in the tables of FIGS. 3-5.

The spectrum produced by the time to frequency domain converter 1108 passes to a critical band normalizer 1110, which normalizes the spectrum in each of the critical bands. In other words, the frequency with the greatest amplitude in each critical band is set to one and all other frequencies within each of the critical bands are normalized accordingly. For example, if critical band one includes frequencies having amplitudes of 112, 56, 56, 56, 56, 56, and 56, the critical band normalizer would adjust the frequencies to be 1, 0.5, 0.5, 0.5, 0.5, 0.5, and 0.5. Of course, any desired maximum value may be used in place of one for the normalization. The critical band normalizer 1110 outputs the normalized score for each of the frequencies of the interest.

The spectrum of scores produced by the critical band normalizer 1110 is passed to the symbol scorer 1112, which calculates a total score for each of the possible symbols in the active symbol table. In an example implementation, the symbol scorer 1112 iterates through each symbol in the symbol table and sums the normalized score from the critical band normalizer 1110 for each of the frequencies of interest for the particular symbol to generate a score for the particular symbol. The symbol scorer 1112 outputs a score for each of the symbols to the max score selector 1114, which selects the symbol with the greatest score and outputs the symbol and the score.

The identified symbol and score from the max score selector 1114 are passed to the comparator 1116, which compares the score to a threshold. When the score exceeds the threshold, the comparator 1116 outputs the received symbol. When the score does not exceed the threshold, the comparator 1116 outputs an error indication. For example, the comparator 1116 may output a symbol indicating an error (e.g., a symbol not included in the active symbol table) when the score does not exceed the threshold. Accordingly, when a message has been corrupted such that a great enough score (i.e., a score that does not exceed the threshold) is not calculated for a symbol, an error indication is provided. In an example implementation, error indications may be provided to the stacker controller 1106 to cause the stacker 1104 to be enabled when a threshold number of errors are identified (e.g., number of errors over a period of time, number of consecutive errors, etc.).

The identified symbol or error from the comparator 1116 is passed to the circular buffers 1118 and the pre-existing code flag circular buffers 1120. An example implementation of the standard buffers 1118 is described in conjunction with FIG. 15. The example circular buffers 1118 comprise one circular buffer for each slide of the time domain to frequency domain converter 1108 (e.g., 192 buffers). Each circular buffer of the circular buffers 1118 includes one storage location for the synchronize symbol and each of the symbol blocks in a message (e.g., eight block messages would be stored in eight location circular buffers) so that an entire message can be stored in each circular buffer. Accordingly, as the audio samples are processed by the time domain to frequency domain converter 1108, the identified symbols are stored in the same location of each circular buffer until that location in each circular buffer has been filled. Then, symbols are stored in the next location in each circular buffer. In addition to storing symbols, the circular buffers 1118 may additionally include a location in each circular buffer to store a sample index indicating the sample in the audio signal that was received that resulted in the identified symbol.

The example pre-existing code flag circular buffers 1120 are implemented in the same manner as the circular buffers 1118, except the pre-existing code flag circular buffers 1120 include one location for the pre-existing code flag synchronize symbol and one location for each symbols in the pre-existing code flag message (e.g., an pre-existing code flag synchronize that includes one message symbol would be stored in two location circular buffers). The pre-existing code flag circular buffers 1120 are populated at the same time and in the same manner as the circular buffers 1118.

The example message identifier 1122 analyzes the circular buffers 1118 and the pre-existing code flag circular buffers 1120 for a synchronize symbol. For example, the message identifier 1122 searches for a synchronize symbol in the circular buffers 1118 and an pre-existing code flag synchronize symbol in the pre-existing code flag circular buffers 1120. When a synchronize symbol is identified, the symbols following the synchronize symbol (e.g., seven symbols after a synchronize symbol in the circular buffers 1118 or one symbol after an pre-existing code flag synchronize symbol in the pre-existing code flag circular buffers 1120) are output by the message identifier 1122. In addition, the sample index identifying the last audio signal sample processed is output.

The message symbols and the sample index output by the message identifier 1122 are passed to the validator 1124, which validates each message. The validator 1124 includes a filter stack that stores several consecutively received messages. Because messages are repeated (e.g., every 2 seconds or 16,000 samples at 8 KHz), each message is compared with other messages in the filter stack that are separated by approximately the number of audio samples in a single message to determine if a match exists. If a match or substantial match exists, both messages are validated. If a message cannot be identified, it is determined that the message is an error and is not emitted from the validator 1124. In cases where messages might be affected by noise interference, messages might be considered a match when a subset of symbols in a message match the same subset in another already validated message. For example, if four of seven symbols in a message match the same four symbols in another message that has already been validated, the message can be identified as partially validated. Then, a sequence of the repeated messages can be observed to identify the non-matching symbols in the partially validated message.

The validated messages from the validator 1124 are passed to the symbol to bit converter 1126, which translates each symbol to the corresponding data bits of the message using the active symbol table.

An example decoding process 1200 is shown in FIG. 12. The example process 1200 may be carried out by the example decoder 116 shown in FIG. 11, or by any other suitable decoder. The example process 1200 begins by sampling audio (block 1202). The audio may be obtained via an audio sensor, a hardwired connection, via an audio file, or through any other suitable technique. As explained above the sampling may be carried out at 8,000 Hz, or any other suitable frequency.

As each sample is obtained, the sample is aggregated by a stacker such as the example stacker 1104 of FIG. 11 (block 1204). An example process for performing the stacking is described in conjunction with FIG. 13.

The new stacked audio samples from the stacker process 1204 are inserted into a buffer and the oldest audio samples are removed (block 1206). As each sample is obtained, a sliding time to frequency conversion is performed on a collection of samples including numerous older samples and the newly added sample obtained at blocks 1202 and 1204 (block 1208). In one example, a sliding FFT may be used to process streaming input samples including 9215 old samples and the one newly added sample. In one example, the FFT using 9216 samples results in a spectrum having a resolution of 5.2 Hz.

After the spectrum is obtained through the time to frequency conversion (block 1208), the transmitted symbol is determined (block 1210). An example process for determining the transmitted symbol is described in conjunction with FIG. 14.

After the transmitted message is identified (block 1210), buffer post processing is performed to identify a synchronize symbol and corresponding message symbols (block 1212). An example process for performing post-processing is described in conjunction with FIG. 15.

After post processing is performed to identify a transmitted message (block 1212), message validation is performed to verify the validity of the message (block 1214). An example process for performing the message validation is described in conjunction with FIG. 18.

After a message has been validated (block 1214), the message is converted from symbols to bits using the active symbol table (block 1216). Control then returns to block 1106 to process the next set of samples.

Figure 13:
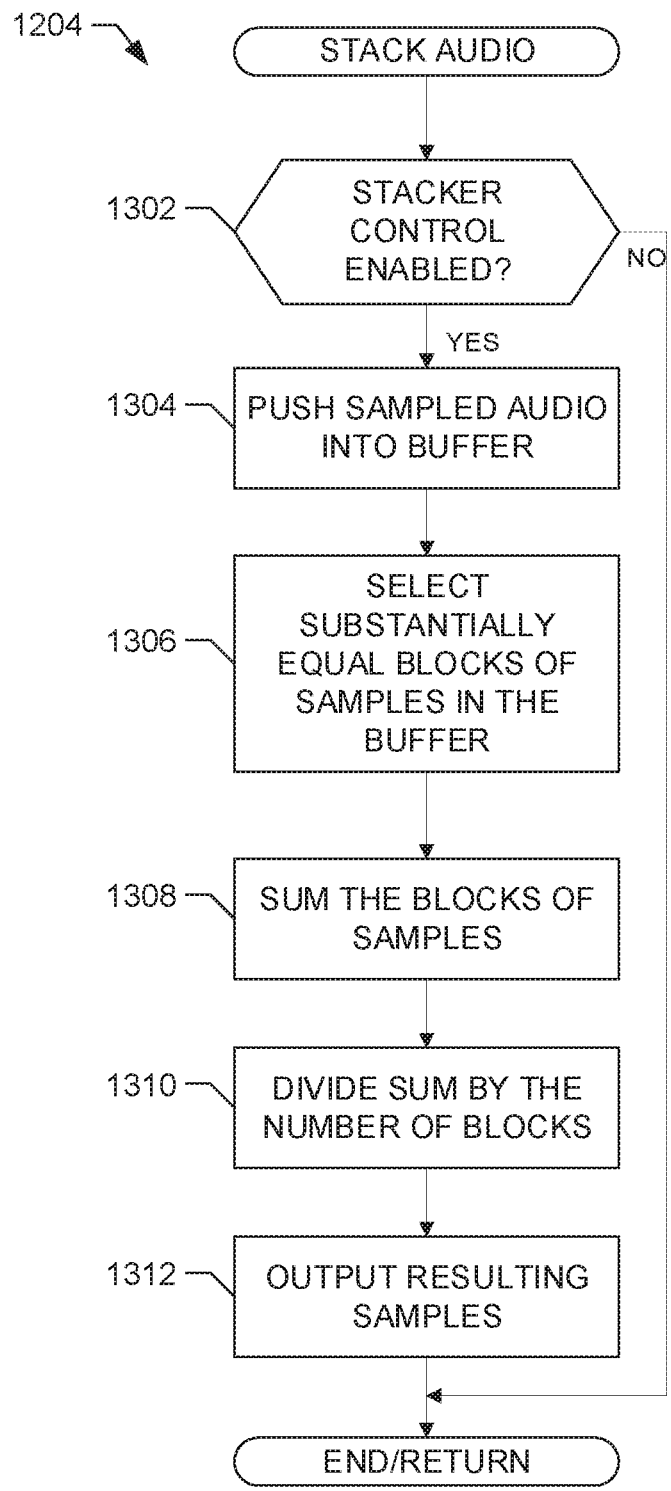
FIG. 13 is a flow diagram of an example process that may be carried out to stack audio in the decoder of FIG. 11.

FIG. 13 illustrates an example process for stacking audio signal samples to accentuate an encoded code signal to implement the stack audio process 1204 of FIG. 12. The example process may be carried out by the stacker 1104 and the stacker controller 1106 of FIG. 11. The example process begins by determining if the stacker control is enabled (block 1302). When the stacker control is not enabled, no stacking is to occur and the process of FIG. 13 ends and control returns to block 1206 of FIG. 12 to process the audio signal samples unstacked.

When the stacker control is enabled, newly received audio signal samples are pushed into a buffer and the oldest samples are pushed out (block 1304). The buffer stores a plurality of samples. For example, when a particular message is repeatedly encoded in an audio signal every two seconds and the encoded audio is sampled at 8 KHz, each message will repeat every 16,000 samples so that buffer will store some multiple of 16,000 samples (e.g., the buffer may store six messages with a 96,000 sample buffer). Then, the stacker 1108 selects substantially equal blocks of samples in the buffer (block 1306). The substantially equal blocks of samples are then summed (block 1308). For example, sample one is added to samples 16,001, 32,001, 48,001, 64,001, and 80,001, sample two is added to samples 16,002, 32,002, 48,002, 64,002, 80,002, sample 16,000 is added to samples 32,000, 48,000, 64,000, 80,000, and 96,000.

After the audio signal samples in the buffer are added, the resulting sequence is divided by the number of blocks selected (e.g., six blocks) to calculate an average sequence of samples (e.g., 16,000 averaged samples) (block 1310). The resulting average sequence of samples is output by the stacker (block 1312). The process of FIG. 13 then ends and control returns to block 1206 of FIG. 12.

Figure 14:
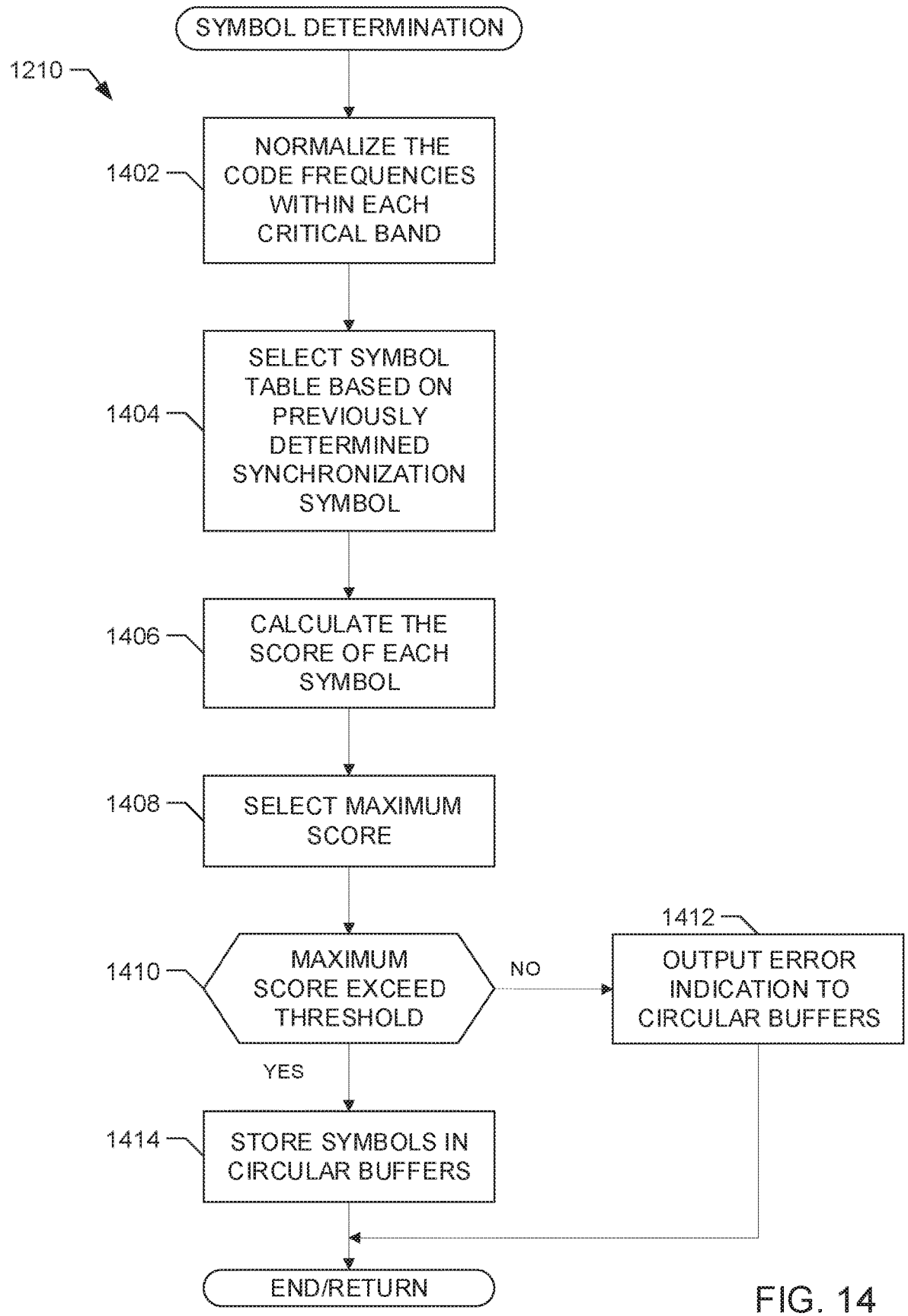
FIG. 14 is a flow diagram of an example process that may be carried out to determine a symbol encoded in an audio signal in the decoder of FIG. 11.

FIG. 14 illustrates an example process for implementing the symbol determination process 1210 after the received audio signal has been converted to the frequency domain. The example process of FIG. 14 may be performed by the decoder 116 of FIGS. 1 and 11. The example process of FIG. 14 begins by normalizing the code frequencies in each of the critical bands (block 1402). For example, the code frequencies may be normalized so that the frequency with the greatest amplitude is set to one and all other frequencies in that critical band are adjusted accordingly. In the example decoder 116 of FIG. 11, the normalization is performed by the critical band normalizer 1110.

After the frequencies of interest have been normalized (block 1402). The example symbol scorer 1112 selects the appropriate symbol table based on the previously determined synchronization table (block 1404). For example, a system may include two symbol tables: one table for a normal synchronization and one table for an pre-existing code flag synchronization. Alternatively, the system may include a single symbol table or may include multiple synchronization tables that may be identified by synchronization symbols (e.g., cross-table synchronization symbols). The symbol scorer 1112 then computes a symbol score for each symbol in the selected symbol table (block 1406). For example, the symbol scorer 1112 may iterate across each symbol in the symbol table and add the normalized scores for each of the frequencies of interest for the symbol to compute a symbol score.

After each symbol is scored (block 1406), the example max score selector 1114 selects the symbol with the greatest score (block 1408). The example comparator 1116 then determines if the score for the selected symbol exceeds a maximum score threshold (block 1410). When the score does not exceed the maximum score threshold, an error indication is stored in the circular buffers (e.g., the circular buffers 1118 and the pre-existing code flag circular buffers 1120) (block 1412). The process of FIG. 14 then completes and control returns to block 1212 of FIG. 12.

When the score exceeds the maximum score threshold (block 1410), the identified symbol is stored in the circular buffers (e.g., the circular buffers 1118 and the pre-existing code flag circular buffers 1120) (block 1414). The process of FIG. 14 then completes and control returns to block 1212 of FIG. 12.

Figure 15:
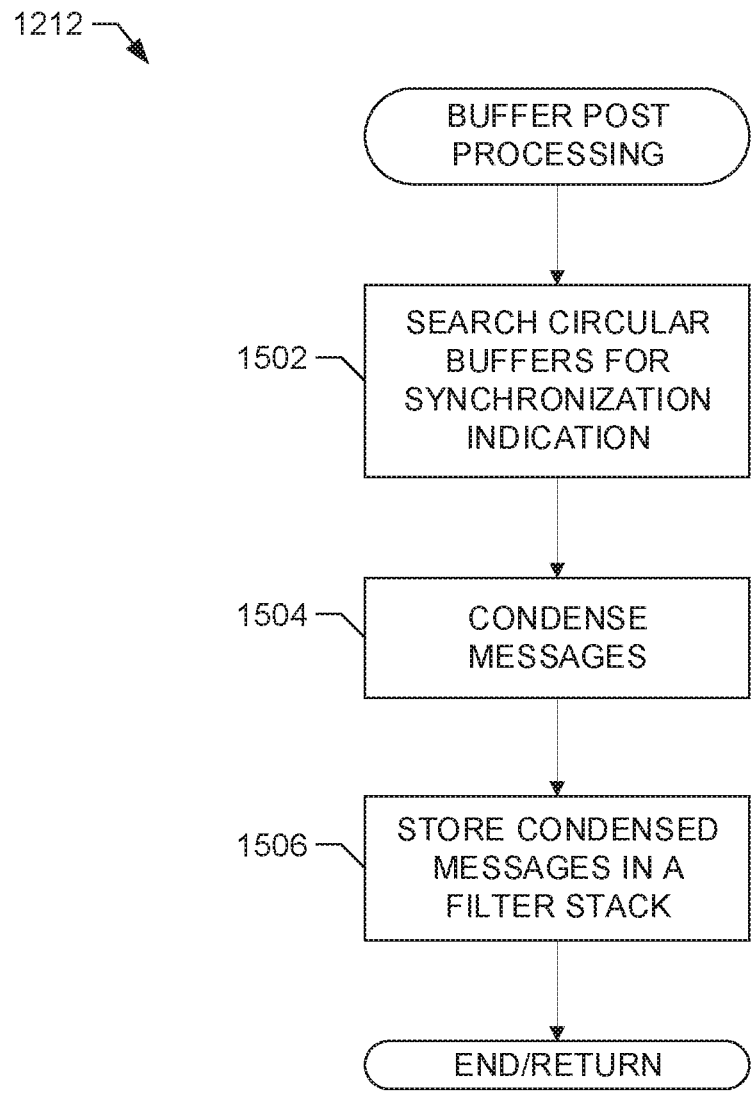
FIG. 15 is a flow diagram of an example process that may be carried out to process a buffer to identify messages in the decoder of FIG. 11.

FIG. 15 illustrates an example process for implementing the buffer post processing 1212 of FIG. 12. The example process of FIG. 15 begins when the message identifier 1122 of FIG. 11 searches the circular buffers 1118 and the circular buffers 1120 for a synchronization indication (block 1502).

For example, FIG. 16 illustrates an example implementation of circular buffers 1118 and FIG. 17 illustrates an example implementation of pre-existing code flag circular buffers 1120. In the illustrated example of FIG. 16, the last location in the circular buffers to have been filled is location three as noted by the arrow. Accordingly, the sample index indicates the location in the audio signal samples that resulted in the symbols stored in location three. Because the line corresponding to sliding index 37 is a circular buffer, the consecutively identified symbols are 128, 57, 22, 111, 37, 23, 47, and 0. Because 128 in the illustrated example is a synchronize symbol, the message can be identified as the symbols following the synchronize symbol. The message identifier 1122 would wait until 7 symbols have been located following the identification of the synchronization symbol at sliding index 37.

The pre-existing code flag circular buffers 1120 of FIG. 17 include two locations for each circular buffer because the pre-existing code flag message of the illustrated example comprises one pre-existing code flag synchronize symbol (e.g., symbol 254) followed by a single message symbol. According to the illustrated example of FIG. 2, the pre-existing code flag data block 230 is embedded in two long blocks immediately following the 7 bit timestamp long block 228. Accordingly, because there are two long blocks for the pre-existing code flag data and each long block of the illustrated example is 1,536 samples at a sampling rate of 8 KHz, the pre-existing code flag data symbol will be identified in the pre-existing code flag circular buffers 3072 samples after the original message. In the illustrated example FIG. 17, sliding index 37 corresponds to sample index 38744, which is 3072 samples later than sliding index 37 of FIG. 16 (sample index 35672). Accordingly, the pre-existing code flag data symbol 68 can be determined to correspond to the message in sliding index 37 of FIG. 16, indicating that the message in sliding index 37 of FIG. 16 identifies an original encoded message (e.g., identifies an original broadcaster of audio) and the sliding index 37 identifies an pre-existing code flag message (e.g., identifies a re-broadcaster of audio).

Returning to FIG. 12, after a synchronize or pre-existing code flag synchronize symbol is detected, messages in the circular buffers 1118 or the pre-existing code flag circular buffers 1120 are condensed to eliminate redundancy in the messages. For example, as illustrated in FIG. 16, due to the sliding time domain to frequency domain conversion and duration of encoding for each message, messages are identified in audio data for a period of time (sliding indexes 37-39 contain the same message). The identical messages in consecutive sliding indexes can be condensed into a single message because they are representative of only one encoded message. Alternatively, condensing may be eliminated and all messages may be output when desired. The message identifier 1122 then stores the condensed messages in a filter stack associated with the validator 1124 (block 1506). The process of FIG. 15 then ends and control returns to block 1214 of FIG. 12.

Figure 18:
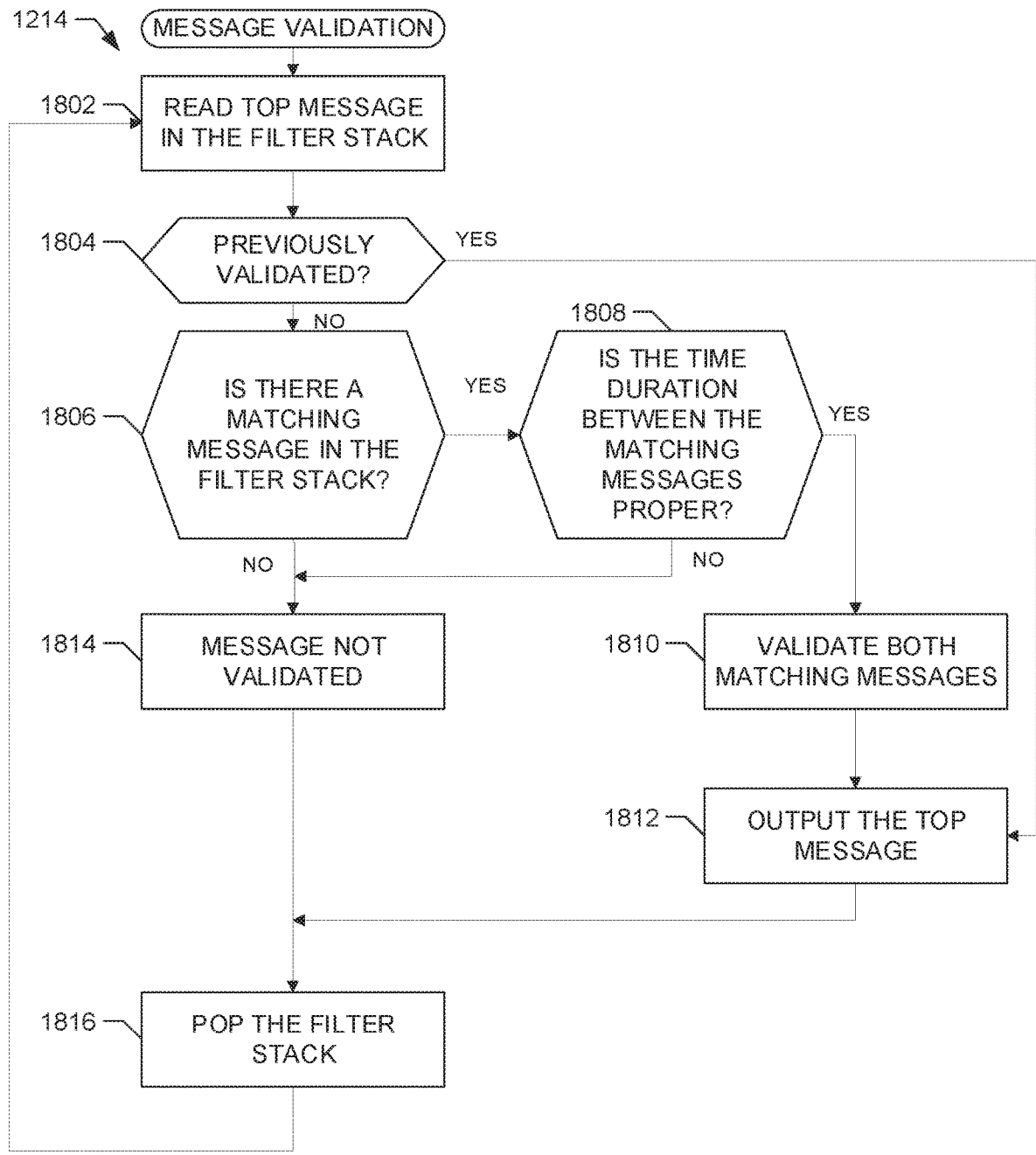
FIG. 18 is a flow diagram of an example process that may be carried out to validate identified messages in the decoder of FIG. 11.

FIG. 18 illustrates an example process to implement the message validation process 1214 of FIG. 12. The example process of FIG. 12 may be performed by the validator 1124 of FIG. 11. The example process of FIG. 18 begins when the validator 1124 reads the top message in the filter stack (block 1802).

For example, FIG. 19 illustrates an example implementation of a filter stack. The example filter stack includes a message index, seven symbol locations for each message index, a sample index identification, and a validation flag for each message index. Each message is added at message index M7 and a message at location M0 is the top message that is read in block 1802 of FIG. 18. Due to sampling rate variation and variation of the message boundary within a message identification, it is expected that messages will be separated by samples indexes of multiples of approximately 16,000 samples when messages are repeated every 16,000 samples.

Returning to FIG. 19, after the top message in the filter stack is selected (block 1802), the validator 1124 determines if the validation flag indicates that the message has been previously validated (block 1804). For example, FIG. 19 indicates that message M0 has been validated. When the message has been previously validated, the validator 1124 outputs the message (block 1812) and control proceeds to block 1816.

When the message has not been previously validated (block 1804), the validator 1124 determines if there is another suitably matching message in the filter stack (block 1806). A message may be suitably matching when it is identical to another message, when a threshold number of message symbols match another message (e.g., four of the seven symbols), or when any other error determination indicates that two messages are similar enough to speculate that they are the same. According to the illustrated example, messages can only be partially validated with another message that has already been validated. When a suitable match is not identified, control proceeds to block 1814.

When a suitable match is identified, the validator 1124 determines if a time duration (e.g., in samples) between identical messages is proper (block 1808). For example, when messages are repeated every 16,000 samples, it is determined if the separation between two suitably matching messages is approximately a multiple of 16,000 samples. When the time duration is not proper, control proceeds to block 1814.

When the time duration is proper (block 1808), the validator 1124 validates both messages by setting the validation flag for each of the messages (block 1810). When the message has been validated completely (e.g., an exact match) the flag may indicate that the message is fully validated (e.g., the message validated in FIG. 19). When the message has only been partially validated (e.g., only four of seven symbols matched), the message is marked as partially validated (e.g., the message partially validated in FIG. 19). The validator 1124 then outputs the top message (block 1812) and control proceeds to block 1816.

When it is determined that there is not a suitable match for the top message (block 1806) or that the time duration between a suitable match(es) is not proper (block 1808), the top message is not validated (block 1814). Messages that are not validated are not output from the validator 1124.

After determining not to validate a message (blocks 1806, 1808, and 1814) or outputting the top message (block 1812), the validator 1816 pops the filter stack to remove the top message from the filter stack. Control then returns to block 1802 to process the next message at the top of the filter stack.

While example manners of implementing any or all of the example encoder 102 and the example decoder 116 have been illustrated and described above one or more of the data structures, elements, processes and/or devices illustrated in the drawings and described above may be combined, divided, re-arranged, omitted, eliminated and/or implemented in any other way. Further, the example encoder 102 and example decoder 116 may be implemented by hardware, software, firmware and/or any combination of hardware, software and/or firmware. Thus, for example, the example encoder 102 and the example decoder 116 could be implemented by one or more circuit(s), programmable processor(s), application specific integrated circuit(s) (ASIC(s)), programmable logic device(s) (PLD(s)) and/or field programmable logic device(s) (FPLD(s)), etc. For example, the decoder 116 may be implemented using software on a platform device, such as a mobile telephone. If any of the appended claims is read to cover a purely software implementation, at least one of the prior code detector 204, the example message generator 210, the symbol selector 212, the code frequency selector 214, the synthesizer 216, the inverse FFT 218, the mixer 220, the overlapping short block maker 240, the masking evaluator 242, the critical band pair definer 702, the frequency definer 704, the number generator 706, the redundancy reducer 708, the excess reducer 710, the code frequency definer 712, the LUT filler 714, the sampler 1102, the stacker 1104, the stacker control 1106, the time domain to frequency domain converter 1108, the critical band normalize 1110, the symbol scorer 1112, the max score selector 1114, the comparator 1116, the circular buffers 1118, the pre-existing code flag circular buffers 1120, the message identifier 1122, the validator 1124, and the symbol to bit converter 1126 are hereby expressly defined to include a tangible medium such as a memory, DVD, CD, etc. Further still, the example encoder 102 and the example decoder 116 may include data structures, elements, processes and/or devices instead of, or in addition to, those illustrated in the drawings and described above, and/or may include more than one of any or all of the illustrated data structures, elements, processes and/or devices.

Figure 20:
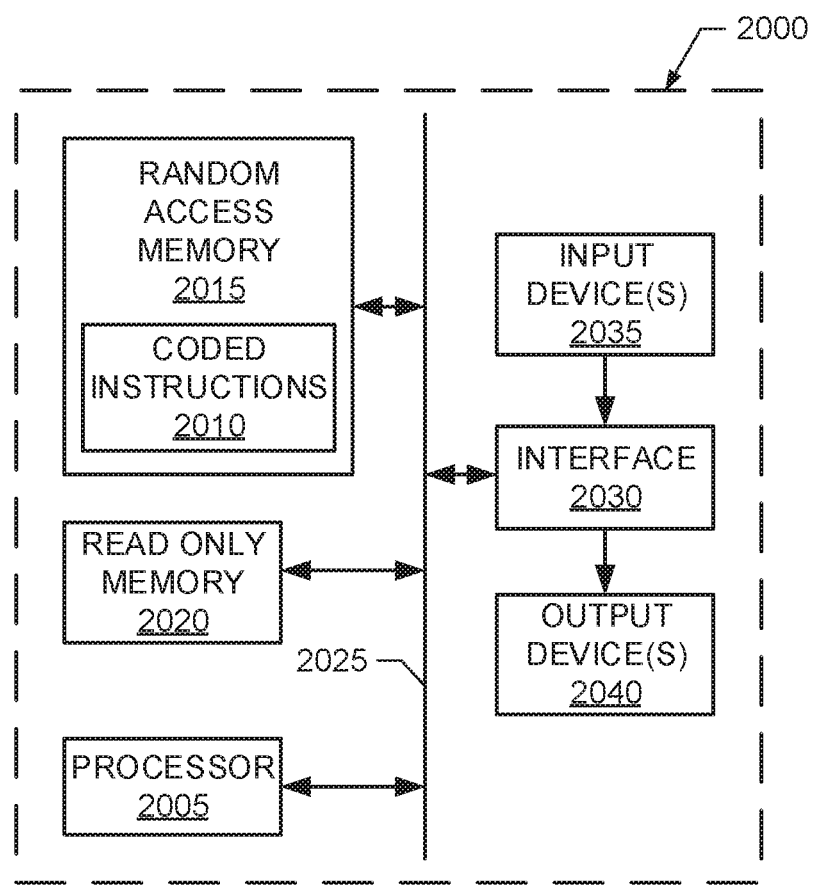
FIG. 20 is a schematic illustration of an example processor platform that may be used and/or programmed to perform any or all of the processes or implement any or all of the example systems, example apparatus and/or example methods described herein.

FIG. 20 is a schematic diagram of an example processor platform 2000 that may be used and/or programmed to implement any or all of the example encoder 102 and the decoder 116, and/or any other component described herein. For example, the processor platform 2000 can be implemented by one or more general purpose processors, processor cores, microcontrollers, etc. Additionally, the processor platform 2000 be implemented as a part of a device having other functionality. For example, the processor platform 2000 may be implemented using processing power provided in a mobile telephone, or any other handheld device.

The processor platform 2000 of the example of FIG. 20 includes at least one general purpose programmable processor 2005. The processor 2005 executes coded instructions 2010 and/or 2012 present in main memory of the processor 2005 (e.g., within a RAM 2015 and/or a ROM 2020). The processor 2005 may be any type of processing unit, such as a processor core, a processor and/or a microcontroller. The processor 2005 may execute, among other things, example machine accessible instructions implementing the processes described herein. The processor 2005 is in communication with the main memory (including a ROM 2020 and/or the RAM 2015) via a bus 2025. The RAM 2015 may be implemented by DRAM, SDRAM, and/or any other type of RAM device, and ROM may be implemented by flash memory and/or any other desired type of memory device. Access to the memory 2015 and 2020 may be controlled by a memory controller (not shown).

The processor platform 2000 also includes an interface circuit 2030. The interface circuit 2030 may be implemented by any type of interface standard, such as a USB interface, a Bluetooth interface, an external memory interface, serial port, general purpose input/output, etc. One or more input devices 2035 and one or more output devices 2040 are connected to the interface circuit 2030.

Although certain example apparatus, methods, and articles of manufacture are described herein, other implementations are possible. The scope of coverage of this patent is not limited to the specific examples described herein. On the contrary, this patent covers all apparatus, methods, and articles of manufacture falling within the scope of the invention.

What is claimed is:

1. An apparatus to transform media into a message, the apparatus comprising:
   a max score selector to:
      decode a first watermark symbol from a plurality of audio samples;
      store the first decoded watermark symbol in tangible memory;
      decode a second watermark symbol from the plurality of audio samples; and
      store the second decoded watermark symbol in the tangible memory; and
   a validator to:
      determine that a first condition is satisfied when the first decoded watermark symbol matches the second decoded watermark symbol;
      determine that a second condition is satisfied when a number of audio samples between a first one of the plurality of audio samples associated with a start of the first decoded watermark symbol and a second one of the plurality of audio samples associated with a start of the second decoded watermark symbol corresponds to a time duration that is a multiple of a period corresponding to a watermark symbol encoding repetition rate; and
      output the first decoded watermark symbol in response to a determination that the first condition and the second condition are satisfied.

2. The apparatus as defined in claim 1, wherein the first decoded watermark symbol and the second decoded watermark symbol are stored in a stack in the tangible memory.

3. The apparatus as defined in claim 2, wherein the validator is further to pop the first decoded watermark symbol from the stack in response to determining that the first decoded watermark symbol matches the second decoded watermark symbol.

4. The apparatus as defined in claim 1, wherein the first decoded watermark symbol is from a first set of the plurality of audio samples starting with the first one of the plurality of audio samples and the second decoded watermark symbol is from a second set of the plurality of audio samples starting with the second one of the plurality of audio samples different from the first one of the audio samples.

5. The apparatus as defined in claim 4, wherein the validator is further to calculate the number of audio samples between the first one of the plurality of audio samples and the second one of the plurality of audio samples.

6. The apparatus as defined in claim 1, wherein the validator is further to validate the first decoded watermark symbol and the second decoded watermark symbol in response to determining that the first decoded watermark symbol matches the second decoded watermark symbol.

7. The apparatus is defined in claim 1, wherein the max score selector is to extract the first decoded watermark symbol by receiving scores indicating a likelihood of encoding for two or more possible watermark symbols and selecting a highest watermark scoring symbol.

8. A computer readable storage disk or storage device comprising instructions that, when executed, cause a processor to at least:
 decode a first watermark symbol from a plurality of audio samples;
 store the first decoded watermark symbol in tangible memory;
 decode a second watermark symbol from the plurality of audio samples;
 store the second decoded watermark symbol in the tangible memory;
 determine that a first condition is satisfied when the first decoded watermark symbol matches the second decoded watermark symbol;
 determine that a second condition is satisfied when a number of audio samples between a first one of the plurality of audio samples associated with a start of the first decoded watermark symbol and a second one of the plurality of audio samples associated with a start of the second decoded watermark symbol corresponds to a time duration that is a multiple of a period corresponding to a watermark symbol encoding repetition rate; and
 output the first decoded watermark symbol in response to a determination that the first condition and the second condition are satisfied.

9. The computer readable storage disk or storage device as defined in claim 8, wherein the first decoded watermark symbol and the second decoded watermark symbol are stored in a stack in the tangible memory.

10. The computer readable storage disk or storage device as defined in claim 9, wherein the instructions further cause the processor to pop the first decoded watermark symbol from the stack in response to determining that the first decoded watermark symbol matches the second decoded watermark symbol.

11. The computer readable storage disk or storage device as defined in claim 8, wherein the first decoded watermark symbol is from a first set of the plurality of audio samples starting with the first one of the plurality of audio samples and the second decoded watermark symbol is from a second set of the plurality of audio samples starting with the second one of the plurality of audio samples different from the first one of the plurality of audio samples.

12. The computer readable storage disk or storage device as defined in claim 11, wherein the instructions further cause the processor to calculate the number of audio samples between the first one of the plurality of audio samples and the second one of the plurality of audio samples.

13. The computer readable storage disk or storage device as defined in claim 8, wherein the instructions further cause the processor to validate the first decoded watermark symbol and the second decoded watermark symbol in response to determining that the first decoded watermark symbol matches the second decoded watermark symbol.

14. A method to transform media into a message, the method comprising:
 decoding, by executing an instruction with a processor, a first watermark symbol from a plurality of audio samples;
 storing the first decoded watermark symbol in tangible memory;
 decoding, by executing the instruction with the processor, a second watermark symbol from the plurality of audio samples;
 storing the second decoded watermark symbol in the tangible memory;
 determining that a first condition is satisfied when the first decoded watermark symbol matches the second decoded watermark symbol;
 determining that a second condition is satisfied when a number of audio samples between a first one of the plurality of audio samples associated with a start of the first decoded watermark symbol and a second one of the plurality of audio samples associated with a start of the second decoded watermark symbol corresponds to a time duration that is a multiple of a period corresponding to a watermark symbol encoding repetition rate; and
 outputting the first decoded watermark symbol in response to a determination that the first condition and the second condition are satisfied.

15. The method as defined in claim 14, wherein the first decoded watermark symbol and the second decoded watermark symbol are stored in a stack in the tangible memory.

16. The method as defined in claim 15, further including popping the first decoded watermark symbol from the stack in response to determining that the first decoded watermark symbol matches the second decoded watermark symbol.

17. The method as defined in claim 14, wherein the first decoded watermark symbol is from a first set of the plurality of audio samples starting with the first one of the plurality of audio samples and the second decoded watermark symbol is from a second set of the plurality of audio samples starting with the second one of the plurality of audio samples different from the first one of the plurality of audio samples.

18. The method as defined in claim 17, further including calculating the number of audio samples between the first one of the plurality of audio samples and the second one of the plurality of audio samples.

19. The method as defined in claim 14, further including validating the first decoded watermark symbol and the second decoded watermark symbol in response to determining that the first decoded watermark symbol matches the second decoded watermark symbol.

* * * * *